(12) United States Patent
Hashimoto

(10) Patent No.: US 9,639,201 B2
(45) Date of Patent: May 2, 2017

(54) TOUCH PANEL, POSITION SENSING METHOD OF TOUCH PANEL, AND INTEGRATED CIRCUIT

(75) Inventor: Masashi Hashimoto, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 158 days.

(21) Appl. No.: 14/410,755

(22) PCT Filed: Jun. 29, 2012

(86) PCT No.: PCT/KR2012/005214
§ 371 (c)(1),
(2), (4) Date: Dec. 23, 2014

(87) PCT Pub. No.: WO2014/003225
PCT Pub. Date: Jan. 3, 2014

(65) Prior Publication Data
US 2015/0177901 A1 Jun. 25, 2015

(30) Foreign Application Priority Data

Jun. 25, 2012 (KR) .................. 10-2012-0068237
Jun. 25, 2012 (KR) .................. 10-2012-0068238
Jun. 26, 2012 (KR) .................. 10-2012-0068807

(51) Int. Cl.
*G06F 3/041* (2006.01)
*G06F 3/044* (2006.01)
*G06F 3/038* (2013.01)

(52) U.S. Cl.
CPC .......... *G06F 3/0416* (2013.01); *G06F 3/038* (2013.01); *G06F 3/044* (2013.01); *G06F 2203/04112* (2013.01)

(58) Field of Classification Search
CPC .................. G06F 3/038; G06F 2203/04112
See application file for complete search history.

(56) References Cited

U.S. PATENT DOCUMENTS

| 2008/0129898 A1* | 6/2008 | Moon ................. G02F 1/13338 349/12 |
| 2010/0013788 A1 | 1/2010 | Park et al. ..................... 345/174 |
| 2012/0098790 A1 | 4/2012 | Han .............................. 345/174 |

FOREIGN PATENT DOCUMENTS

| JP | 2010-117955 A | 5/2010 |
| KR | 10-2010-0008668 A | 1/2010 |

(Continued)

OTHER PUBLICATIONS

International Search Report dated Feb. 20, 2013 issued in Application No. PCT/KR2012/005214.

*Primary Examiner* — Larry Sternbane
*Assistant Examiner* — Maheen Javed
(74) *Attorney, Agent, or Firm* — KED & Associates, LLP

(57) ABSTRACT

A touch panel according to the disclosure includes a touch screen including a plurality of X electrode lines and Y electrode lines, which are alternately disposed with each other, and generating signals that vary depending on a touch position; and a plurality of comparators connected between first and second Y electrode lines adjacent to each other, wherein the touch position on the touch screen is detected based on output codes prepared by using output values of the comparators. A method for detecting a position of a touch panel according to the disclosure includes the steps of generating a position signal that varies according to a touch position between a plurality of X electrode lines and first and second Y electrode lines, which are adjacent to each other and alternately disposed with X electrode lines; detecting adjacent signals from a Y electrode line adjacent to a left of the first Y electrode and a Y electrode line adjacent to a right of the second Y electrode line; inputting the adjacent signal as an input signal of the comparator; overlapping the position signal on one of the detected adjacent signals; and comparing the input signal using the comparator. An inte- (Continued)

grated circuit according to the disclosure includes a plurality of comparators including a positive input terminal receiving a first input signal that varies depending on a touch position, a negative input terminal receiving a second input signal, and an output terminal outputting a comparison signal of the first and second input signals; and an operation unit generating a position signal by reading out the comparison signal of the comparators.

12 Claims, 11 Drawing Sheets

(56) References Cited

FOREIGN PATENT DOCUMENTS

| KR | 10-2011-0000985 A | 1/2011 |
| KR | 10-2011-0030198 A | 3/2011 |

* cited by examiner

TOUCH PANEL, POSITION SENSING METHOD OF TOUCH PANEL, AND INTEGRATED CIRCUIT

CROSS-REFERENCE TO RELATED PATENT APPLICATIONS

This application is a U.S. National Stage Application under 35 U.S.C. §371 of PCT Application No. PCT/KR2012/005214, filed Jun. 29, 2012, which claims priority to Korean Patent Application Nos. 10-2012-0068237 and 10-2012-0068238 both filed on Jun. 25, 2012; and 10-2012-0068807 filed Jun. 26, 2012, whose entire disclosures are hereby incorporated by reference.

TECHNICAL FIELD

The disclosure relates to a capacitive type touch panel, a position sensing method of the touch panel, and an integrated circuit.

BACKGROUND ART

In general, a touch panel is used as an input device for a personal computer, a portable communication device, and other personal information processing devices to allow a user to input information by directly touching the touch panel using a hand or a pen.

Recently, the touch panel is employed in various information processing devices because the touch panel has advantages of a simple structure with less malfunction and easy portability, and a user can easily input characters without other input devices and easily know the usage of the touch panel.

The touch panel may adopt a capacitive type, in which an equipotential is formed on a conductive layer and a position of upper and lower plates where voltage variation occurs is sensed according to the touch of the user.

According to the general usage of the touch panel, the user touches an icon of a switch having a predetermined function using a finger from among selection switches displayed on the touch panel, thereby selectively driving a desired function. At this time, if a pitch of the switches (interval between adjacent switches) is narrower than a finger width, it is difficult to select the desired switch. In general, the finger width of an adult is about 8 mm, so it is undesired if the pitch is smaller than 8 mm. In addition, it is also meaningless if the resolution for a touch position of the finger is set to 8 mm or above. For this reason, a line pitch of the touch panel is set to about 8 mm.

However, different from the selection of the switches, when the user sketches or writes characters using the touch panel, the input work may be facilitated as the resolution for the touch position becomes high. In particular, when the input work is performed by using an article having a sharp tip, such as a stylus pen which is used instead of the finger, the high resolution is desired.

DISCLOSURE OF INVENTION

Technical Problem

The disclosure relates to a capacitive type touch panel having a resolution higher than a pitch of an electrode line, a position sensing method of the touch panel, and an integrated circuit.

Solution to Problem

A touch panel according to the embodiment of the disclosure includes a touch screen having a plurality of X electrode lines and Y electrode lines, which are alternately disposed with each other, and generating signals that vary depending on a touch position; and a plurality of comparators connected between first and second Y electrode lines adjacent to each other, wherein the touch position on the touch screen is detected based on output codes prepared by using output values of the comparators.

A method for detecting a position of a touch panel according to the embodiment of the disclosure includes the steps of generating a position signal that varies according to a touch position between a plurality of X electrode lines and first and second Y electrode lines, which are adjacent to each other and alternately disposed with X electrode lines; detecting adjacent signals from a Y electrode line adjacent to a left of the first Y electrode and a Y electrode line adjacent to a right of the second Y electrode line; inputting the adjacent signal as an input signal of the comparator; overlapping the position signal on one of the detected adjacent signals; and comparing the input signal using the comparator.

An integrated circuit according to the embodiment of the disclosure includes a plurality of comparators including a positive input terminal receiving a first input signal that varies depending on a touch position, a negative input terminal receiving a second input signal, and an output terminal outputting a comparison signal of the first and second input signals; and an operation unit generating a position signal by reading out the comparison signal of the comparators.

Advantageous Effects of Invention

The embodiment of the disclosure can provide a capacitive type touch panel having a resolution higher than a pitch of an electrode line, a position sensing method of the touch panel, and an integrated circuit.

MODE FOR THE INVENTION

Hereinafter, exemplary embodiments of the disclosure will be described in detail with reference to accompanying drawings. Details of other embodiments will be included in the detailed description and drawings. Advantages and features of the disclosure and means of accomplishing the same will be apparent from the embodiments described below in detail with reference to accompanying drawings.

Figure 1:
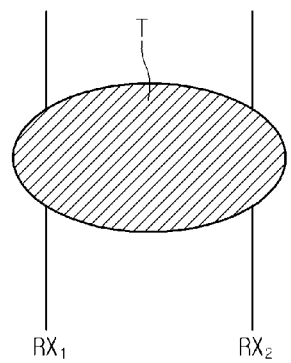
FIG. 1 is a view showing a touch region T of a touch panel touched by a finger.

FIG. 1 is a view showing a touch region T of a touch panel touched by a finger.

The touch panel according to the disclosure may include a typical touch screen or a touch pad having a function of a display unit for displaying information as well as a function of an input unit for inputting signals, and the disclosure may not be limited or restricted to the type of touch panels and the driving scheme thereof.

The touch panel includes a touch screen having a plurality of X electrode lines TX1 to TXn and a plurality of Y electrode lines RX1 to RXm, which are alternately arranged on a transparent substrate while interposing an insulating layer therebetween.

According to the projected capacitive sensing type touch panel, when a finger or a pen touches the touch panel, projected capacitance is generated in the touch region, so mutual capacitance Cm at intersections of the X electrode lines TX1 to TXn and the Y electrode lines RX1 to RXm disposed in the touch panel is reduced corresponding to negative capacitance generated as the pen touches the touch panel, thereby detecting the touch to the touch panel.

The touch position on the touch screen can be sensed by determining the touch to the corresponding region based on the variation of capacitance generated between the X electrode lines TX1 to TXn and the Y electrode lines RX1 to RXm.

As shown in FIG. 1, if the touch region T is larger than the pitch between adjacent Y electrode lines, the finger may make contact with the adjacent Y electrode lines, so it is determined that the finger touches both of the Y electrode lines RX1 and RX2.

Figure 2:
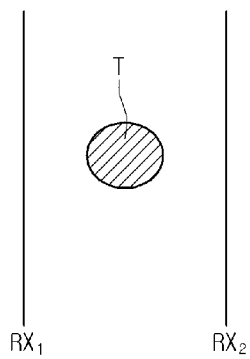
FIG. 2 is a view showing a touch region T of a touch panel touched by a pen.

FIG. 2 is a view showing a touch region T of the touch panel touched by a pen. Since the width of the touch region T is narrower than the pitch Lp between adjacent Y electrode lines RX, position information indicating the position of centers of the pen and the touch region T of the touch panel can be obtained. That is, the position resolution higher than the line pitch Lp of the Y electrode lines RX can be obtained.

In general, the Cm value is given as a function of the touch position. The function of the touch position corresponding to the Cm value may vary depending on the pattern of the X electrode lines TX1 to TXn and the Y electrode lines RX1 to RXm. The Cm value may be expressed as following equations.

$$C_{M1}(X) = C_D\left(1 - \frac{X}{Lp}\right) \quad \text{Equation 1}$$

$$C_{M2}(X) = C_D \frac{X}{Lp} \quad \text{Equation 2}$$

In equations 1 and 2, CD represents capacitance of a dummy capacitor.

Figure 3:
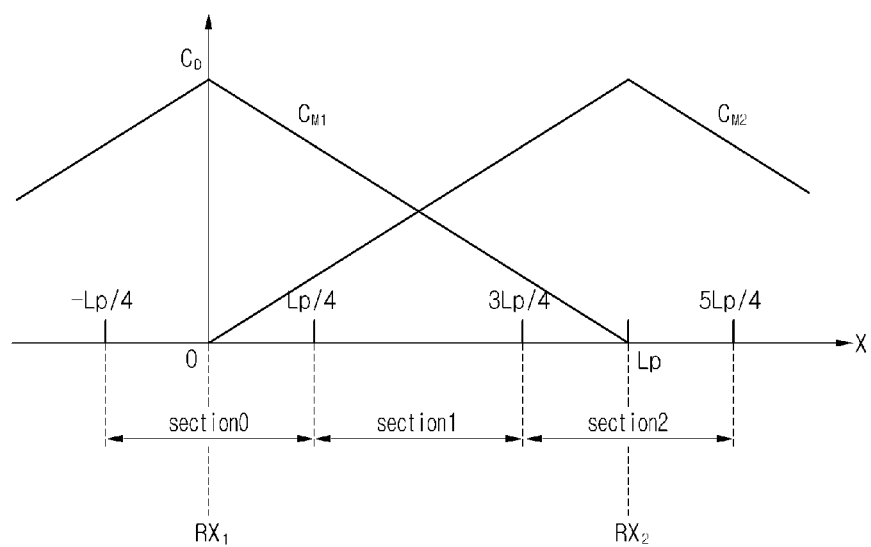
FIG. 3 is a graph showing a dependency of Cm to realize ⅓ resolution for X electrode lines.

FIG. 3 is a graph showing a dependency of the Cm with respect to the X electrode lines. For the purpose of simplicity of explanation, the Cm is converted into a 1-dimensional function of X in a section $0 \leq X \leq Lp$ in FIG. 3. That is, Cm1 and Cm2 are given as a function of a position X.

If the Cm value between the X electrode lines TX1 to TXn and the Y electrode lines RX1 to RXm is changed, potential variation ΔVRX is generated due to the capacitive coupling when the X electrode lines are driven with VDD. The touch position can be detected by tracing the potential variation ΔVRX. According to the disclosure, the differential signal sensing is performed for detecting a difference between two signals, so signals of two adjacent Y electrode lines are regarded as pair signals.

In the following description, an RX1 line serves as a first Y electrode line, and an RX2 line adjacent to the RX1 line serves as a second Y electrode line. In addition, Cm1 and Cm2 are mutual capacitance between the TX line and RX1 and RX2 lines and may vary depending on the touch position. Further, X is a position coordinate, in which the center of the RX1 line is 0 and the center of the RX2 line is Lp.

As shown in FIG. 3, the touch position is divided into three sections of $-Lp/4 \leq X < Lp/4$ (section 0), $Lp/4 \leq X < 3Lp/4$ (section 1) and $3Lp/4 \leq X < 5Lp/4$ (section 2). The reason for setting the section $-Lp/4 \leq X < Lp/4$, instead of $0 \leq X < Lp/4$, is that the Cm1 exerts an influence upon the RX0-RX1.

When the touch position is divided into n sections, (n−1) boundary values may exist, so (n−1) comparators are necessary. In detail, if the touch position is divided into three sections, two boundary values may exist, so two comparators are necessary. In the same manner, if the position resolution corresponding to ⅕ of the RX line pitch is obtained, the touch position is divided into five sections, so four boundary values may exist and two comparators are necessary.

In addition, the RX0-RX1 pair adjacent to each other at the left side and the RX2-RX3 pair adjacent to each other at the right side are influenced by the touch region, so the operation of the pairs must be considered.

Figure 4:
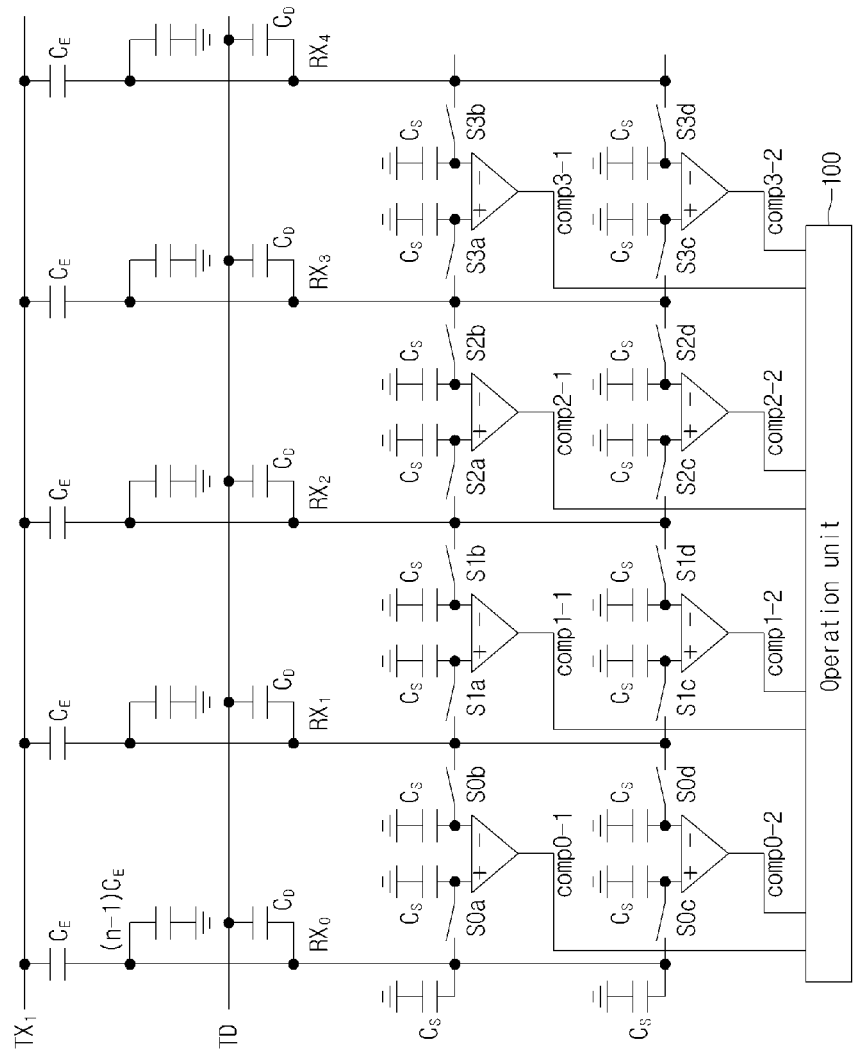
FIG. 4 is a circuit view showing main circuits to realize ⅓ resolution of an RF line pitch.

Hereinafter, the operation principle of the disclosure will be described in detail. A case with two comparators will be described as an example. FIG. 4 is a circuit view showing main circuits to realize ⅓ resolution of an RF line pitch, and FIG. 5 is a diagram showing control signal points of main circuits shown in FIG. 4.

According to the embodiment of the disclosure, a plurality of comparators are connected to two adjacent Y electrode lines, and the touch position on the touch screen can be detected based on the output code prepared by using output values of the comparators.

The pen touch position detection algorithm requires one or both of a digital output 2 bit code 00 of the RX0-RX1 pair adjacent to each other at the left side of the RX1-RX2 pair and a digital output 2 bit code 02 of the RX2-RX3 pair adjacent to each other at the right side of the RX1-RX2 pair as well as a digital output 2 bit code 01 of the RX1-RX2 pair (an output of a comparator 1-1 is a high-order bit and an output of a comparator 1-2 is a low-order bit), so all of them are illustrated.

Figure 5:
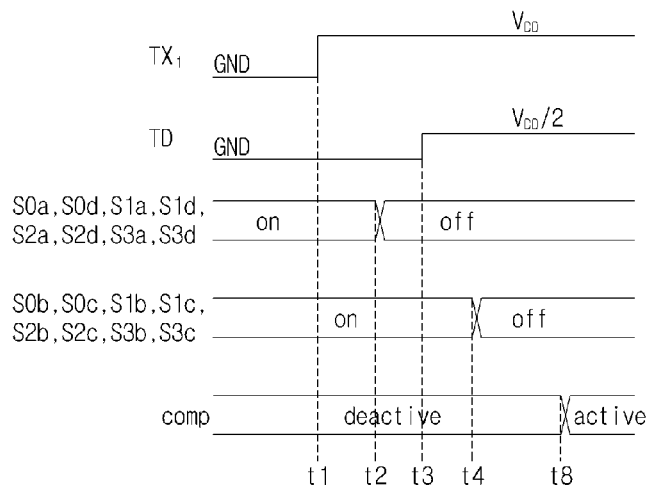
FIG. 5 is a diagram showing control signal points of main circuits shown in FIG. 4.

As shown in FIG. 5, ground voltage GND is applied to the X electrode lines TX1-TXn. To this end, the ground voltage GND may be applied to another TD electrode line TD extending across the Y electrode lines RX1-RXm.

At the point of t1, VDD voltage is applied to the TX1 line. Thus, the potential of the RX1 line is changed due to the capacitive coupling caused by Cm1 so the potential variation ΔVRX may occur in the RX line. The RX line has been initially precharged with VDD/2.

The potential VRX1(t1) of the RX1 line can be expressed as follows by taking the potential dependency of Cm1 into consideration.

$$V_{RX1}(t1) = \frac{V_{DD}}{2} + \frac{C_E - C_{M1}(X)}{nC_E + 4C_S + C_D}V_{DD} \cong \frac{V_{DD}}{2} + \frac{C_E - C_{M1}(X)}{nC_E + C_D}V_{DD}$$

Equation 3

In equation 3, Cs represents capacitance of sampling voltage holding capacitors, and CE represents capacitance of each coupling capacitor at the intersections between X electrode lines and Y electrode lines.

In the same manner, the potentials VRX0(t1), VRX2(t1), and VRX3(t1) of the RX0, RX2, and RX3 lines can be expressed as follows by taking the position dependency of Cm2 into consideration.

$$V_{RX0}(t1) \cong \frac{V_{DD}}{2} + \frac{C_E}{nC_E + C_D}V_{DD}$$

Equation 4

$$V_{RX2}(t1) \cong \frac{V_{DD}}{2} + \frac{C_E - C_{M2}(X)}{nC_E + C_D}V_{DD}$$

$$V_{RX3}(t1) \cong \frac{V_{DD}}{2} + \frac{C_E}{nC_E + C_D}V_{DD}$$

At the point of t1, the potential of each RX line can be detected through the above equation. At the point shown in FIG. 2, switches of S0a, S0d, S1a, S1d, S2a, and S2d are turned off. Thus, the VRX0(t1) can be held by the sampling capacitor CS0a of the comparator 0-1, the VRX1(t1) can be held by the sampling capacitor CS1a of the comparator 1-1 and the sampling capacitor CS0d of the comparator 0-2, the VRX2(t1) can be held by the sampling capacitor CS2a of the comparator 2-1 and the sampling capacitor CS1d of the comparator 1-2, and the VRX3(t1) can be held by the sampling capacitor CS3a of the comparator 3-1 and the sampling capacitor CS2d of the comparator 1-2.

Then, in order to realize ⅓ resolution, the TD is driven with VDD/2 at the point of t3. Thus, the following equation can be established.

$$V_{RX0}(t3) \cong V_{RX0}(t1) + \frac{1/2C_D}{nC_E + C_D}V_{DD}$$

Equation 5

$$V_{RX1}(t3) \cong V_{RX1}(t1) + \frac{1/2C_D}{nC_E + C_D}V_{DD}$$

$$V_{RX2}(t3) \cong V_{RX2}(t1) + \frac{1/2C_D}{nC_E + C_D}V_{DD}$$

$$V_{RX3}(t3) \cong V_{RX3}(t1) + \frac{1/2C_D}{nC_E + C_D}V_{DD}$$

In addition, if switches of S0b, S0c, S1b, S1c, S2b, and S2c are turned off at the point of t4, the VRX0(t3) is held by the sampling capacitor CS0c of the comparator 0-2, the VRX1(t3) is held by the sampling capacitor CS1c of the comparator 1-2 and the sampling capacitor CS0b of the comparator 0-1, the VRX2(t3) is held by the sampling capacitor CS2c of the comparator 2-2 and the sampling capacitor CS1b of the comparator 1-1, and the VRX2(t3) is held by the sampling capacitor CS3c of the comparator 3-2 and the sampling capacitor CS2b of the comparator 2-1, respectively.

If the differential sensing is operated at the point of t8 by activating the comparators 0-1, 0-2, 1-1 and 1-2, the differential voltage satisfies the following equations.

$$\Delta V_{comp0-1} \cong \frac{C_{M1}(X) - 1/2C_D}{nC_E + C_D}V_{DD} =$$

Equation 6

$$\frac{V_{DD}}{nC_E + C_D}C_D\left(\frac{1}{2} - \frac{1}{Lp}X\right)$$

$$\Delta V_{comp0-2} \cong \frac{C_{M1}(X) + 1/2C_D}{nC_E + C_D}V_{DD} =$$

Equation 7

$$\frac{V_{DD}}{nC_E + C_D}C_D\left(\frac{3}{2} - \frac{1}{Lp}X\right) \geq 0$$

$$\Delta V_{comp1-1} \cong \frac{\{C_{M2}(X) - C_{M1}(X)\} - 1/2C_D}{nC_E + C_D}V_{DD} =$$

Equation 8

$$\frac{V_{DD}}{nC_E + C_D}2C_D\left(\frac{1}{Lp}X - \frac{3}{4}\right)$$

$$\Delta V_{comp1-2} \cong \frac{\{C_{M2}(X) - C_{M1}(X)\} + 1/2C_D}{nC_E + C_D}V_{DD} =$$

Equation 9

$$\frac{V_{DD}}{nC_E + C_D}2C_D\left(\frac{1}{Lp}X - \frac{1}{4}\right)$$

$$\Delta V_{comp2-1} \cong \frac{-C_{M2}(X) - 1/2C_D}{nC_E + C_D}V_{DD} =$$

Equation 10

$$\frac{V_{DD}}{nC_E + C_D}C_D\left(-\frac{1}{2} - \frac{1}{Lp}X\right) \leq 0$$

$$\Delta V_{comp2-2} \cong \frac{-C_{M2}(X) + 1/2C_D}{nC_E + C_D}V_{DD} =$$

Equation 11

$$\frac{V_{DD}}{nC_E + C_D}C_D\left(\frac{1}{2} - \frac{1}{Lp}X\right)$$

If ΔVcomp1-1 is equal to or higher than 0, the comparator 1-1 output a digital signal 1, and if ΔVcomp1-1 is less than 0, the comparator 1-1 outputs a digital signal 0. If the 2 bit code is expressed as 01 by setting the output of the comparator 1-1 as the high-order bit and the output of the comparator 1-2 as the low-order bit, the followings can be obtained based on equations 8 and 9, in which −Lp/4≤X<Lp/4 is 01[00], which is decimal {0}, Lp/4≤X<3Lp/4 is 01[01], which is decimal {1}, and 3Lp/4≤X<5Lp/4 is 01[11], which is decimal {2}. That is, 01 indicates the pen touch position.

In the same manner, the codes of 00 and 02 can be obtained from equations 6, 7, 10, and 11. When the code sequence is set as 00→01→02, the code sequence of 00→01→02 is expressed as [11]→[00]→[01], that is, {2}→{0}→{1} in the case of −Lp/4≤X<Lp/4, that is, in the case of section 0. In addition, the code sequence of 00→01→02 is expressed as [11]→[01]→[00], that is, {2}→{1}→{0} in the case of Lp/4≤X<3Lp/4. Further, in the case of 3Lp/4≤X<5Lp/4, the code sequence of 00→01→02 is expressed as [01]→[11]→[00], that is, {1}→{2}→{0}.

All codes except for the above three code sequences are expressed as [01]. Thus, if there is no pen touch, the code sequence of 00→01→02 is expressed as [01]→[01]→[01], that is, {1}→{1}→{1}. In generalization, if one left output code is added, the code sequence is expressed as [01]→[11]→[00]→[01] in the case of −Lp/4≤X<Lp/4. In addition, if one right output code is added, the code sequence is expressed as [01]→[11]→[00]→[01] in the case of 3Lp/4≤X<5Lp/4, so they cannot be distinguished from each other. However, in the case of the former, one block is shifted to the left. Thus, if the shift is corrected, both of them can indicate the same pen touch position.

Since there is no left-side pair adjacent to the leftmost pair, it is not necessary to consider the pen touch at the above region. This rule can also be applied to the rightmost pair.

If there is a pen touch to the leftmost pair, the code sequence of 00→01→02 is expressed as [00]→[01]→[01] according to the pen touch position in the case of X<Lp/4, that is, in the case of section 0. In addition, in the case of Lp/4≤X<3Lp/4, that is, in the case of section 1, the code sequence of 00→01→02 is expressed as [01]→[00]→[01]. Further, in the case of 3Lp/4≤X<5Lp/4, that is, in the case of section 2, the code sequence of 00→01→02 is expressed as [11]→[00]→[01].

As described above, the code sequence of 3Lp/4≤X<5Lp/4, which is the pen touch position of the leftmost pair (RX0-RX1 pair), is the same as the code sequence of −Lp/4≤X<Lp/4, which is the pen touch position of the RX1-RX2 pair.

In the same manner, if there is a pen touch to the rightmost pair, the code sequence of 0n-3→0n-2→0n-1 is expressed as [01]→[11]→[00] according to the pen touch position in the case of −Lp/4≤X<Lp/4, that is, in the case of section 0. In addition, in the case of Lp/4≤X<3Lp/4, that is, in the case of section 1, the code sequence of 00→01→02 is expressed as [01]→[11]→[01]. Further, in the case of 3Lp/4≤X, that is, in the case of section 2, the code sequence of 00→01→02 is expressed as [01]→[01]→[11].

The output code (for example, code of 03) of RX pairs except for the RX pairs adjacent to left and right sides of the RX pair touched by the pen is expressed as [01] without exception. In this case, projection capacitance Cm may not occur, so the following equation can be satisfied.

$$V_{RX3}(t1) \cong \frac{V_{DD}}{2} + \frac{C_E}{nC_E + C_D}V_{DD} \qquad \text{Equation 12}$$

$$V_{RX4}(t1) \cong \frac{V_{DD}}{2} + \frac{C_E}{nC_E + C_D}V_{DD}$$

In the same manner as the case where the pen touch occurs, the potential $V_{RX3}(t1)$ may be held by the sampling capacitor $C_{S3a}$ of the comparator 3-1, and the potential $V_{RX4}(t1)$ is held by the sampling capacitor $C_{S3d}$ of the comparator 3-2.

In addition, the following equation is satisfied at the point of t3.

$$V_{RX3}(t3) \cong V_{RX3}(t1) + \frac{1/2C_D}{nC_E + C_D}V_{DD} \qquad \text{Equation 13}$$

$$V_{RX4}(t3) \cong V_{RX4}(t1) + \frac{1/2C_D}{nC_E + C_D}V_{DD}$$

In the same manner as the case where the pen touch occurs, the potential $V_{RX3}(t3)$ may be held by the sampling capacitor $C_{S3c}$ of the comparator 3-2, and the potential $V_{RX4}(t3)$ is held by the sampling capacitor $C_{S3b}$ of the comparator 3-1. The differential input of each comparator satisfies the following equation.

$$\Delta V_{comp3-1} \cong \frac{-1/2C_D}{nC_E + C_D} < 0 \qquad \text{Equation 14}$$

$$\Delta V_{comp3-2} \cong \frac{1/2C_D}{nC_E + C_D} > 0$$

The following rules can be obtained from the above.

In the case of the leftmost pair ($RX_0$-$RX_1$ pair), if $0_0$=[00]={0}, the pen touches section 0 of the $RX_0$-$RX_1$ pair. If $0_0$=[01]={1} and $0_1$=[00]={0}, the pen touches section 1 of the $RX_0$-$RX_1$ pair. If $0_0$=[11]={2} and $0_1$=[00]={0}, the pen touches section 2 of the $RX_0$-$RX_1$ pair.

In the case of the rightmost pair ($RX_{n-1}$-$RX_n$ pair), if $0_{n-2}$=[11]={2} and $0_{n-1}$=[01]={1}, the pen touches section 1 of the $RX_{n-1}$-$RX_n$ pair. If $0_{n-1}$=[11]={2}, the pen touches section 2 of the $RX_{n-1}$-$RX_n$ pair.

As to the pair except for the leftmost and rightmost pairs (that is, the $RX_k$-$RX_{k+1}$ pair), if $0_{k-1}$=[11]={2}, $0_k$=[01]={1}, and $0_{k+1}$=[00]={0}, the pen touches section 1 of the $RX_{k-1}$-$RX_k$ pair. If $0_{k-1}$=[01]={1}, $0_k$=[11]={2}, and $0_{k+1}$=[00]={0}, the pen touches section 2 of the $RX_{k-1}$-$RX_k$ pair.

If any of the above rules is not satisfied, it is determined that there is no pen touch.

Figure 6A:
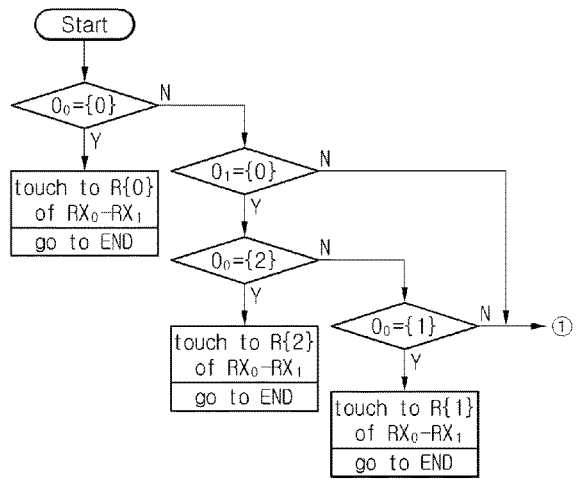
FIG. 6 is a first flowchart showing a process for determining a pen touch position.
Figure 6B:
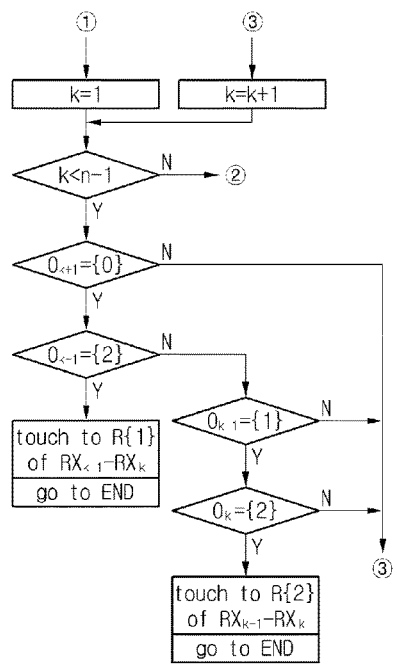
Figure 6C:
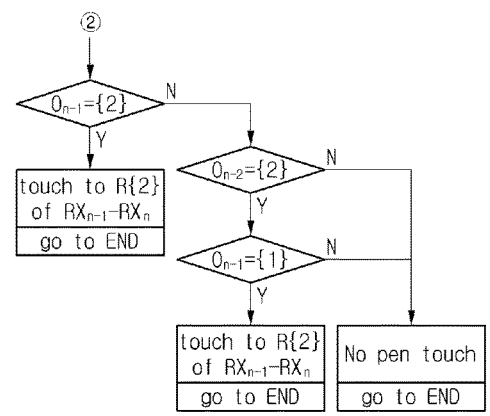
Figure 7A:
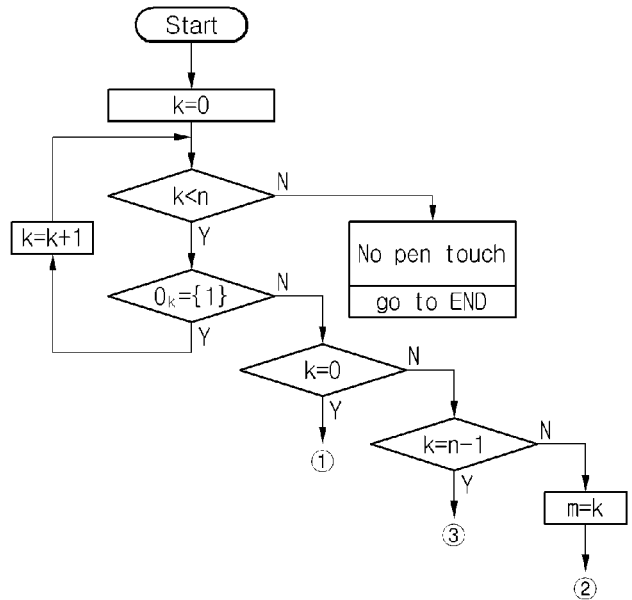
FIG. 7 is a second flowchart showing a process for determining a pen touch position.
Figure 7B:
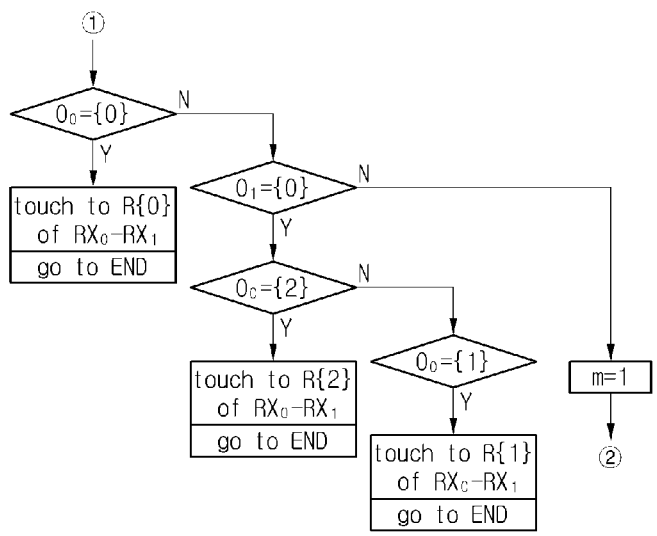
Figure 7C:
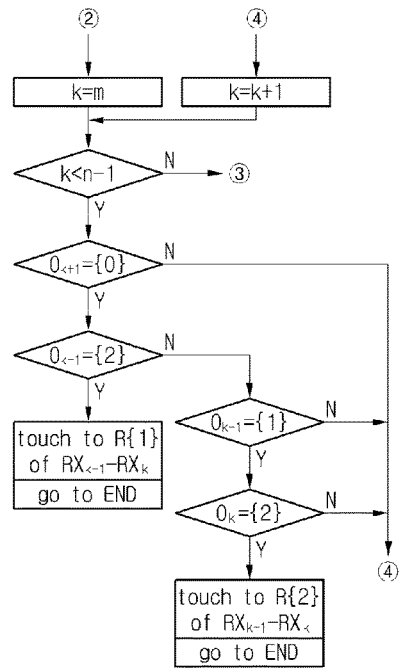
Figure 7D:
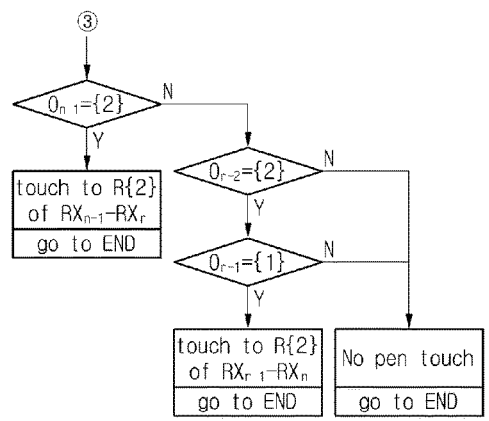

FIG. 6 is a first flowchart showing a process for determining a pen touch position and FIG. 7 is a second flowchart showing a process for determining a pen touch position.

If there is no pen touch to the selected TX line even though the pen touch position determination algorithm is driven for each TX line, all output codes from $0_0$ to $0_n$ are {1}, and this situation may occur with high probability in general. Thus, in order to shorten the algorithm driving time, it is determined whether the output codes from $0_0$ to $0_n$ are {1}, and the determination program is operated only when the output code is not {1}, which is shown in FIG. 7.

Figure 8:
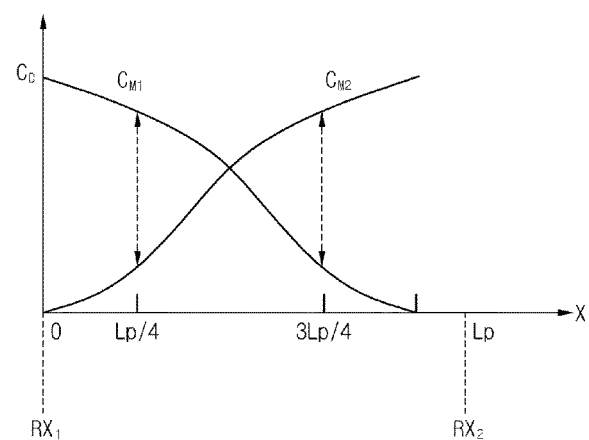
FIG. 8 is a graph showing a general dependency of Cm to realize ⅓ resolution.

FIG. 8 is a graph showing an X dependency of Cm. In FIG. 3, the Cm value is the 1-dimensional function of the pen position. However, actually, the Cm value is the high-order function of X as shown in FIG. 8. In this case, it is not necessary to calculate the function of Cm. In the case of X=Lp/4 and 3Lp/4, it is sufficient if the values of Cm(X=Lp/4) and Cm(X=3Lp/4) are obtained. The function can be obtained through the same method by using the above values.

Hereinafter, a method for realizing ⅕ resolution of the RX line pitch will be described. In order to obtain ⅕ resolution of the RX line pitch, as shown in FIG. 9, the RX period is divided into five sections (sections 0 to 4) of −Lp/8=X<Lp/8, Lp/8=X<3Lp/8, 3Lp/8=X<5Lp/8, 5Lp/8=X<7Lp/8, and 7Lp/8=X<9Lp/8.

Figure 10:
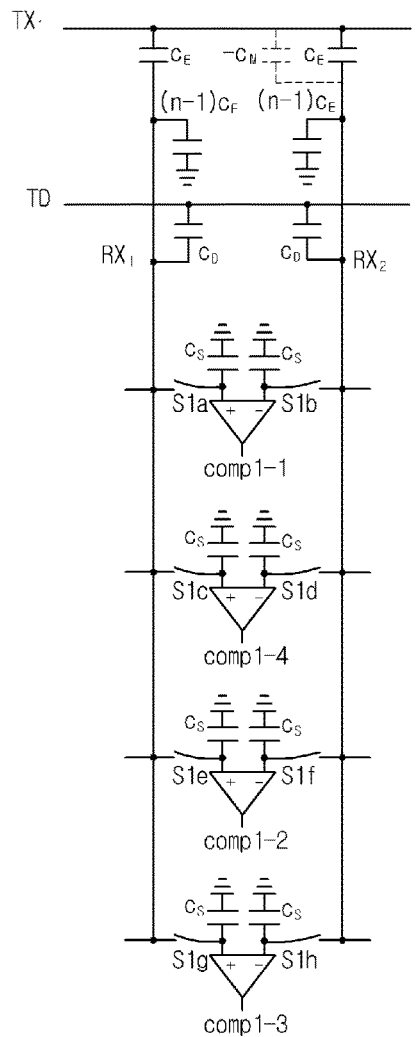
FIG. 10 is a circuit view showing main circuits to realize ⅕ resolution of an RX line pitch.
Figure 11:
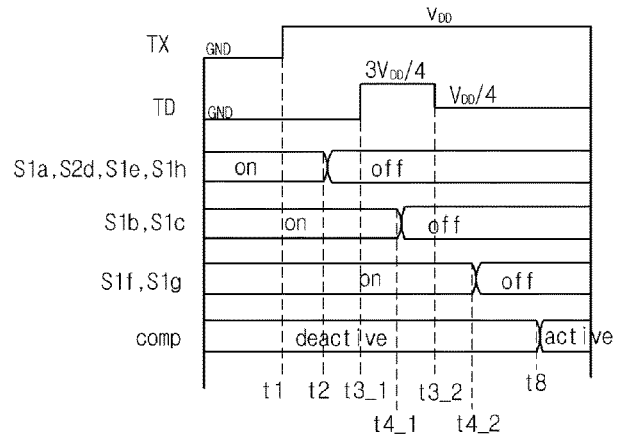
FIG. 11 is a diagram showing control signal points of main circuits shown in FIG. 10.
Figure 12A:
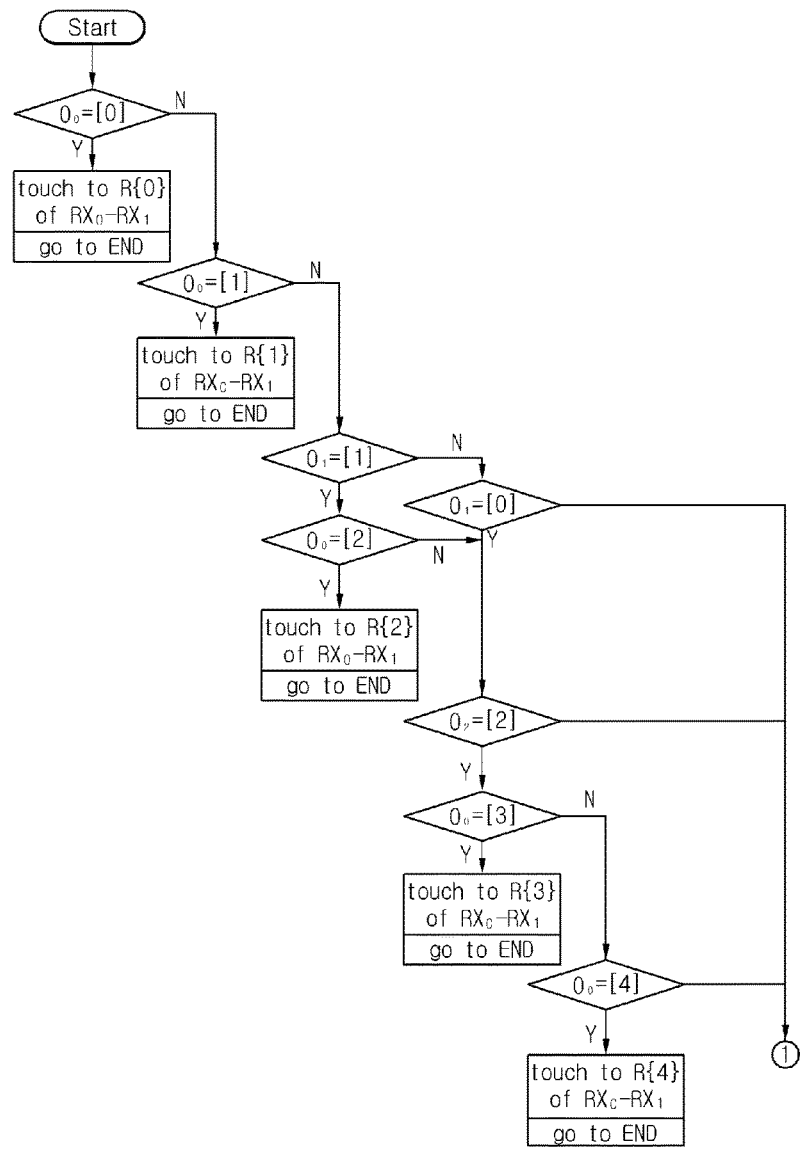
FIG. 12 is a flowchart showing a process for determining a pen touch position to realize ⅕ resolution.
Figure 12B:
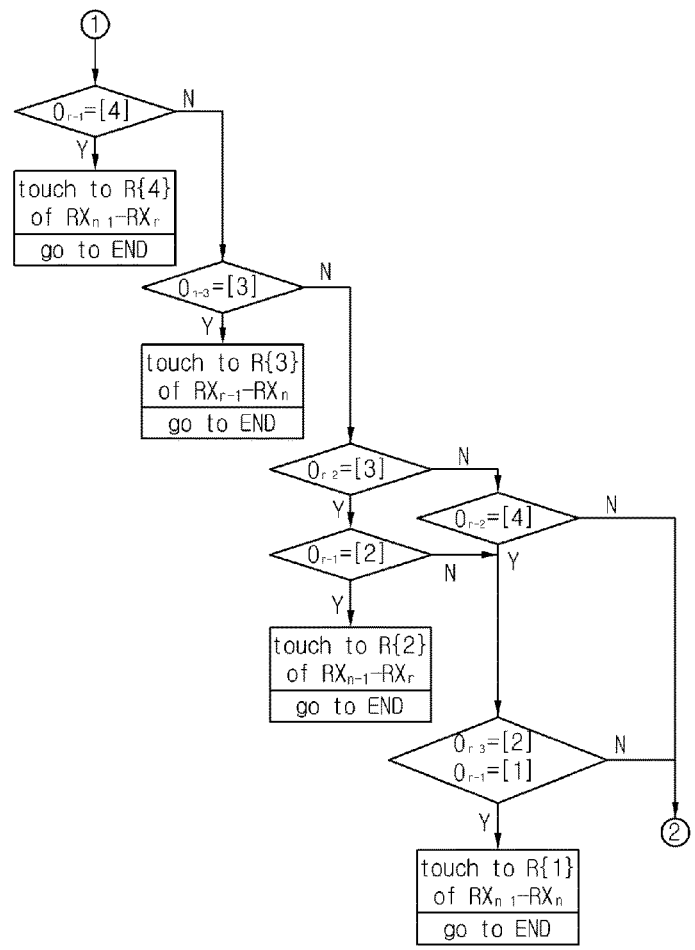
Figure 12C:
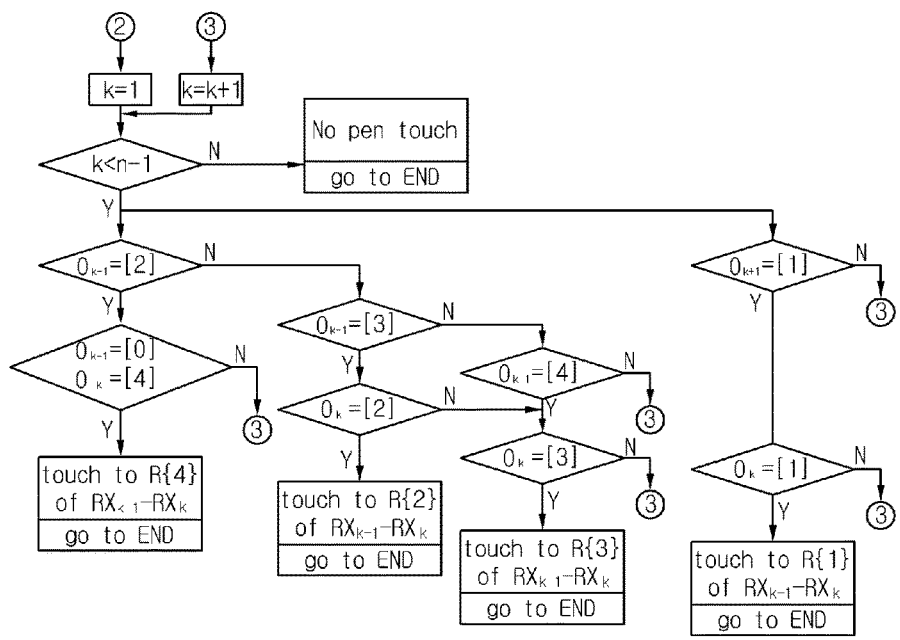

FIG. 10 is a circuit view showing main circuits to realize ⅕ resolution of the RX line pitch, FIG. 11 is a diagram showing control signal points of main circuits shown in FIG. 10, and FIG. 12 is a third flowchart showing a process for determining a pen touch position to realize ⅕ resolution.

Figure 9:
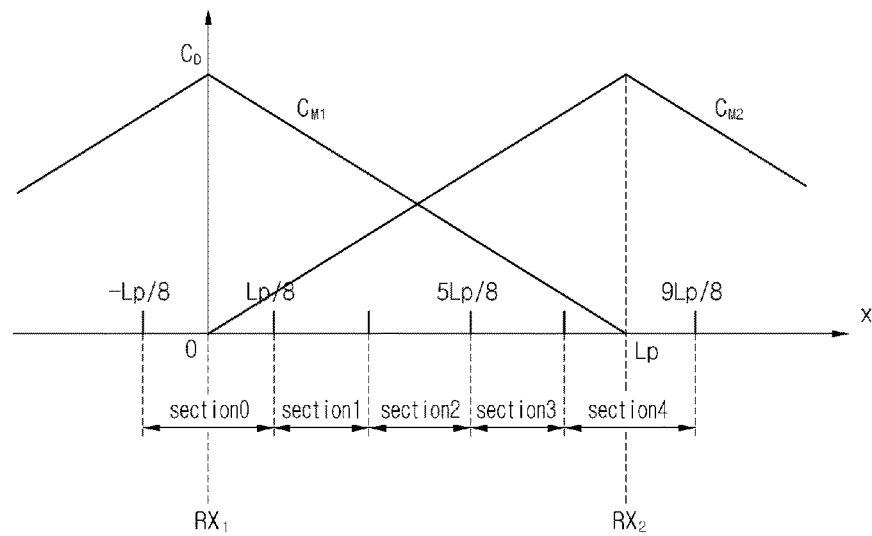
FIG. 9 is a graph showing a dependency of Cm to realize ⅕ resolution.

As shown in FIG. 9, when ⅕ resolution is obtained, the values of $Cm_2$-$Cm_1$ are −3CD/4 at X=Lp/8, −CD/4 at X=3Lp/8, CD/4 at X=5Lp/8, and 3CD/4 at X=7Lp/8. The above values represent the boundary conditions.

In contrast, when ⅓ resolution is obtained, the values of $Cm_2$-$Cm_1$ are −0.5CD at X=0.25Lp and 0.5CD at X=0.75Lp. Therefore, when the ⅓ resolution is obtained, two boundary conditions and the differential level of the input signals are compared in the comparators. Thus, two comparators are necessary. In the same manner, since four boundary conditions are required to obtain the ⅕ resolution, four comparators are necessary.

As shown in FIG. 11, voltage is applied to $RX_1$ and $RX_2$ lines at the point of t1 as expressed by the following equation.

$$V_{RX1}(t1) \cong \frac{V_{DD}}{2} + \frac{C_E - C_{M1}(X)}{nC_E + C_D} V_{DD} \qquad \text{Equation 15}$$

$$V_{RX2}(t1) \cong \frac{V_{DD}}{2} + \frac{C_E - C_{M2}(X)}{nC_E + C_D} V_{DD}$$

In addition, switches of S1a, S1d, S1e, and S1h are turned off at the point of t2. Thus, the potential $VRX_1(t1)$ can be held by the sampling capacitor $C_{S1a}$ of the comparator 1-1 and the sampling capacitor $C_{S0e}$ of the comparator 1-2, and the potential $VRX_2(t1)$ can be held by the sampling capacitor $C_{S1d}$ of the comparator 1-4 and the sampling capacitor $C_{S1h}$ of the comparator 1-3.

Then, in order to input the boundary values of −3CD/4 and 3CD/4 to comparators 1-1 and 1-4, the TD is driven with 3VDD/4 from the point of t3_1 to the point of t3_2. This can be expressed as the following equation.

$$V_{RX1}(t3\_1) \cong V_{RX1}(t1) + \frac{3/4C_D}{nC_E + C_D} V_{DD} \qquad \text{Equation 16}$$

$$V_{RX2}(t3\_1) \cong V_{RX2}(t1) + \frac{3/4C_D}{nC_E + C_D} V_{DD}$$

Switches of S1b and S1c are turned off at the point of t4_1. The potential $VRX_1(t3\_1)$ can be held by the sampling capacitor $C_{S1c}$ of the comparator 1-4 and the potential $VRX_2(t3\_1)$ can be held by the sampling capacitor $C_{S1b}$ of the comparator 1-1.

Then, in order to input the boundary values of −CD/4 and CD/4 to comparators 1-2 and 1-3, the TD is driven with VDD/4 at the point of t3_2. This can be expressed as the following equation.

$$V_{RX1}(t3\_2) \cong V_{RX1}(t1) + \frac{1/4C_D}{nC_E + C_D} V_{DD} \qquad \text{Equation 17}$$

$$V_{RX2}(t3\_2) \cong V_{RX2}(t1) + \frac{1/4C_D}{nC_E + C_D} V_{DD}$$

Switches of S1f and S1g are turned off at the point of t4_2. The potential $VRX_1(t3\_2)$ can be held by the sampling capacitor $C_{S1f}$ of the comparator 1-2, and the potential $VRX_2(t3\_2)$ can be held by the sampling capacitor $C_{S1g}$ of the comparator 1-3.

The comparators 1-1, 1-2, 1-3, and 1-4 are activated at the point of t8 and the differential sensing is operated. The differential potential is expressed as following equations.

$$\Delta V_{comp1-1} \cong \frac{\{C_{M2}(X) - C_{M1}(X)\} - 3/4C_D}{nC_E + C_D} V_{DD} = \qquad \text{Equation 18}$$

$$\frac{V_{DD}}{nC_E + C_D} 2C_D\left(\frac{1}{Lp}X - \frac{1}{8}\right)$$

$$\Delta V_{comp1-2} \cong \frac{\{C_{M2}(X) - C_{M1}(X)\} - 1/4C_D}{nC_E + C_D} V_{DD} = \qquad \text{Equation 19}$$

$$\frac{V_{DD}}{nC_E + C_D} 2C_D\left(\frac{1}{Lp}X - \frac{3}{8}\right)$$

$$\Delta V_{comp1-3} \cong \frac{\{C_{M2}(X) - C_{M1}(X)\} - 1/4C_D}{nC_E + C_D} V_{DD} = \qquad \text{Equation 20}$$

$$\frac{V_{DD}}{nC_E + C_D} 2C_D\left(\frac{1}{Lp}X - \frac{5}{8}\right)$$

$$\Delta V_{comp1-4} \cong \frac{\{C_{M2}(X) - C_{M1}(X)\} + 3/4C_D}{nC_E + C_D} V_{DD} = \qquad \text{Equation 21}$$

$$\frac{V_{DD}}{nC_E + C_D} 2C_D\left(\frac{1}{Lp}X - \frac{7}{8}\right)$$

The differential level of the input signal of the comparator adjacent to the left and right sides can be expressed as following equations.

$$\Delta V_{comp0-1} \cong \qquad \text{Equation 22}$$

$$\frac{C_{M1}(X) - 3/4C_D}{nC_E + C_D} V_{DD} = \frac{V_{DD}}{nC_E + C_D} C_D\left(\frac{1}{4} - \frac{1}{Lp}X\right)$$

$$\Delta V_{comp0-2} \cong \qquad \text{Equation 23}$$

$$\frac{C_{M1}(X) - 1/4C_D}{nC_E + C_D} V_{DD} = \frac{V_{DD}}{nC_E + C_D} C_D\left(\frac{3}{4} - \frac{1}{Lp}X\right)$$

$$\Delta V_{comp0-3} \cong \frac{C_{M1}(X) + 1/4C_D}{nC_E + C_D} V_{DD} = \qquad \text{Equation 24}$$

$$\frac{V_{DD}}{nC_E + C_D} C_D\left(\frac{5}{4} - \frac{1}{Lp}X\right) \geq 0$$

$$\Delta V_{comp0-4} \cong \frac{C_{M1}(X) + 3/4C_D}{nC_E + C_D} V_{DD} = \qquad \text{Equation 25}$$

$$\frac{V_{DD}}{nC_E + C_D} C_D\left(\frac{7}{4} - \frac{1}{Lp}X\right) \geq 0$$

$$\Delta V_{comp2-1} \cong \frac{-C_{M2}(X) - 3/4C_D}{nC_E + C_D} V_{DD} = \qquad \text{Equation 26}$$

$$\frac{V_{DD}}{nC_E + C_D} C_D\left(-\frac{3}{4} - \frac{1}{Lp}X\right) \leq 0$$

$$\Delta V_{comp2-2} \cong \frac{-C_{M2}(X) - 1/4C_D}{nC_E + C_D} V_{DD} = \qquad \text{Equation 27}$$

$$\frac{V_{DD}}{nC_E + C_D} C_D\left(-\frac{1}{4} - \frac{1}{Lp}X\right) \leq 0$$

$$\Delta V_{comp2-3} \cong \qquad \text{Equation 28}$$

$$\frac{-C_{M2}(X) + 1/4C_D}{nC_E + C_D} V_{DD} = \frac{V_{DD}}{nC_E + C_D} C_D\left(\frac{1}{4} - \frac{1}{Lp}X\right)$$

$$\Delta V_{comp2-4} \cong \qquad \text{Equation 29}$$

$$\frac{-C_{M2}(X) + 3/4C_D}{nC_E + C_D} V_{DD} = \frac{V_{DD}}{nC_E + C_D} C_D\left(\frac{3}{4} - \frac{1}{Lp}X\right)$$

At 4-bit output code of each block, if a comparator X-1 is set with the highest-order bit, a comparator X-2 is set with the second bit, the comparator X-3 is set with the third bit, and a comparator X-4 is set with the fourth bit, the bit can be expressed as [0000], [0001], [0011], [0111], and [1111] corresponding to {0}, {1}, {2}, {3} and {4} in decimal.

If there is a touch to the $RX_1$-$RX_2$, the code sequence of $0_0 \rightarrow 0_1 \rightarrow 0_2$ can be calculated as follows by using the above equation.

In the case of $-Lp/8 \leq X < Lp/8$, that is, in the case of section 0, the code sequence of $0_0 \to 0_1 \to 0_2$ can be expressed as $[1111] \to [0000] \to [0011]$ or $\{4\} \to \{0\} \to \{2\}$. In the case of $Lp/8 \leq X < 2Lp/8$, that is, in the case of the left side about the center of section 1, the code sequence of $0_0 \to 0_1 \to 0_2$ can be expressed as $[1111] \to [0001] \to [0011]$ or $\{4\} \to \{1\} \to \{2\}$. In addition, in the case of $2Lp/8 \leq X < 3Lp/8$, that is, in the case of the right side about the center of section 1, the code sequence of $0_0 \to 0_1 \to 0_2$ can be expressed as $[0111] \to [0001] \to [0001]$, or $\{3\} \to \{1\} \to \{1\}$. Further, in the case of $3Lp/8 \leq X < 5Lp/8$, that is, in the case of section 2, the code sequence of $0_0 \to 0_1 \to 0_2$ can be expressed as $[0111] \to [0011] \to [0001]$, or $\{3\} \to \{2\} \to \{1\}$. In the case of $5Lp/8 \leq X < 6Lp/8$, that is, in the case of the left side about the center of section 3, the code sequence of $0_0 \to 0_1 \to 0_2$ can be expressed as $[0111] \to [0111] \to [0001]$, or $\{3\} \to \{3\} \to \{1\}$. In addition, in the case of $6Lp/8 \leq X < 7Lp/8$, that is, in the case of the right side about the center of section 3, the code sequence of $0_0 \to 0_1 \to 0_2$ can be expressed as $[0011] \to [0111] \to [0000]$, or $\{2\} \to \{3\} \to \{0\}$. Further, in the case of $7Lp/8 \leq X < 9Lp/8$, that is, in the case of section 3, the code sequence of $0_0 \to 0_1 \to 0_2$ can be expressed as $[0011] \to [111] \to [0000]$, or $\{2\} \to \{4\} \to \{0\}$.

In addition, if there is a touch to the leftmost pair, the code sequence of $0_0 \to 0_1 \to 0_2$ can be expressed as follows.

In the case of $X < Lp/8$, that is, in the case of section 0, the code sequence of $0_0 \to 0_1 \to 0_2$ can be expressed as $[0000] \to [0011] \to [0011]$ or $\{0\} \to \{2\} \to \{2\}$.

In the case of $Lp/8 \leq X < 2Lp/8$, that is, in the case of the left side about the center of section 1, the code sequence of $0_0 \to 0_1 \to 0_2$ can be expressed as $[0001] \to [0011] \to [0011]$ or $\{1\} \to \{2\} \to \{2\}$.

In addition, in the case of $2Lp/8 \leq X < 3Lp/8$, that is, in the case of the right side about the center of section 1, the code sequence of $0_0 \to 0_1 \to 0_2$ can be expressed as $[0001] \to [0001] \to [0011]$ or $\{1\} \to \{1\} \to \{2\}$.

Further, in the case of $3Lp/8 \leq X < 5Lp/8$, that is, in the case of section 2, the code sequence of $0_0 \to 0_1 \to 0_2$ can be expressed as $[0011] \to [0001] \to [0011]$ or $\{2\} \to \{1\} \to \{2\}$.

In the case of $5Lp/8 \leq X < 6Lp/8$, that is, in the case of the left side about the center of section 3, the code sequence of $0_0 \to 0_1 \to 0_2$ can be expressed as $[0111] \to [0001] \to [0011]$ or $\{3\} \to \{1\} \to \{2\}$.

In addition, in the case of $6Lp/8 \leq X < 7Lp/8$, that is, in the case of the right side about the center of section 3, the code sequence of $0_0 \to 0_1 \to 0_2$ can be expressed as $[0111] \to [0000] \to [0011]$ or $\{3\} \to \{0\} \to \{2\}$.

Further, in the case of $7Lp/8 \leq X < 9Lp/8$, that is, in the case of section 4, the code sequence of $0_0 \to 0_1 \to 0_2$ can be expressed as $[1111] \to [0000] \to [0011]$ or $\{4\} \to \{0\} \to \{2\}$.

Meanwhile, if there is a touch to the rightmost pair, the code sequence of $0_{n-3} \to 0_{n-2} \to 0_{n-1}$ can be expressed as follows.

In the case of $X < Lp/8$, that is, in the case of section 0, the code sequence of $0_{n-3} \to 0_{n-2} \to 0_{n-1}$ can be expressed as $[0011] \to [1111] \to [0000]$ or $\{2\} \to \{4\} \to \{0\}$.

In the case of $Lp/8 \leq X < 2Lp/8$, that is, in the case of the left side about the center of section 1, the code sequence of $0_{n-3} \to 0_{n-2} \to 0_{n-1}$ can be expressed as $[0011] \to [1111] \to [0001]$ or $\{2\} \to \{4\} \to \{1\}$.

In the case of $2Lp/8 \leq X < 3Lp/8$, that is, in the case of the right side about the center of section 1, the code sequence of $0_{n-3} \to 0_{n-2} \to 0_{n-1}$ can be expressed as $[0011] \to [0111] \to [0001]$ or $\{2\} \to \{3\} \to \{1\}$.

In the case of $3Lp/8 \leq X < 5Lp/8$, that is, in the case of section 2, the code sequence of $0_{n-3} \to 0_{n-2} \to 0_{n-1}$ can be expressed as $[0011] \to [0111] \to [0011]$ or $\{2\} \to \{3\} \to \{2\}$.

In the case of $5Lp/8 \leq X < 6Lp/8$, that is, in the case of the left side about the center of section 3, the code sequence of $0_{n-3} \to 0_{n-2} \to 0_{n-1}$ can be expressed as $[0011] \to [0111] \to [0111]$ or $\{2\} \to \{3\} \to \{3\}$.

In the case of $6Lp/8 \leq X < 7Lp/8$, that is, in the case of the right side about the center of section 3, the code sequence of $0_{n-3} \to 0_{n-2} \to 0_{n-1}$ can be expressed as $[0011] \to [0011] \to [0111]$ or $\{2\} \to \{2\} \to \{3\}$.

In the case of $7Lp/8 \leq X < 9Lp/8$, that is, in the case of section 4, the code sequence of $0_{n-3} \to 0_{n-2} \to 0_{n-1}$ can be expressed as $[0011] \to [0011] \to [1111]$ or $\{2\} \to \{2\} \to \{4\}$.

If there is no pen touch, the 4-bit output code is expressed as $[0011]$ or $\{2\}$.

The following rules can be obtained from the above.

In the case of the leftmost pair ($RX_0$-$RX_1$ pair), if $0_0 = [0000] = \{0\}$, the pen touches section 0 of the $RX_0$-$RX_1$ pair. If $0_0 = [0001] = \{1\}$, the pen touches section 1 of the $RX_0$-$RX_1$ pair. If $0_0 = [0011] = \{2\}$ and $0_1 = [0001] = \{1\}$, the pen touches section 2 of the $RX_0$-$RX_1$ pair. If $0_0 = [0111] = \{3\}$, $0_1 = [000U]$ and $0_2 = [0011] = \{2\}$, the pen touches section 3 of the $RX_0$-$RX_1$ pair. If $0_0 = [1111] = \{4\}$, $0_1 = [0000] = \{0\}$, and $0_2 = [0011] = \{2\}$, the pen touches section 4 of the $RX_0$-$RX_1$ pair.

In the case of the rightmost pair ($RX_{n-1}$-$RX_n$ pair), if $0_{n-1} = [0001] = \{1\}$, $0_{n-2} = [U111] = \{1\}$ and $0_{n-3} = [0011] = \{2\}$, the pen touches section 1 of the $RX_{n-1}$-$RX_n$ pair. If $0_{n-1} = [0011] = \{2\}$ and $0_{n-2} = [0111]$, the pen touches section 2 of the $RX_{n-1}$-$RX_n$ pair. If $0_{n-1} = [0111] = \{3\}$, the pen touches section 3 of the $RX_{n-1}$-$RX_n$ pair. If $0_{n-1} = [1111] = \{4\}$, the pen touches section 4 of the $RX_{n-1}$-$RX_n$ pair.

As to the pair except for the leftmost and rightmost pairs (that is, the $RX_k$-$RX_{k+1}$ pair), if $0_{k-1} = [1111] = \{4\}$ and $0_k = [0001] = \{1\}$, or $0_k = [0001] = \{1\}$ and $0_{k+1} = [0001] = \{1\}$, the pen touches section 1 of the $RX_{k-1}$-$RX_k$ pair.

If $0_{k-1} = [0111] = \{3\}$ and $0_k = [0011] = \{2\}$, the pen touches section 2 of the $RX_{k-1}$-$RX_k$ pair.

If $0_{k-1} = [0111] = \{4\}$ and $0_k = [0111] = \{3\}$, or $0_k = [0111] = \{3\}$ and $0_{k+1} = [0001] = \{1\}$, the pen touches section 3 of the $RX_{k-1}$-$RX_k$ pair.

If $0_{k-1} = [0011] = \{2\}$, $0_k = [1111] = \{4\}$ and $0_{k+1} = [0000] = \{0\}$, the pen touches section 4 of the $RX_{k-1}$-$RX_k$ pair.

If any of the above rules is not satisfied, it is determined that there is no pen touch.

FIG. 12 is a flowchart showing a process for determining a pen touch position to realize ⅕ resolution. If there is no pen touch to the selected TX line, all output codes from $0_0$ to $0_n$ are $\{2\}$. Thus, in order to reduce power consumption, it is determined whether the output codes from $0_0$ to $0_n$ are $\{2\}$, and the determination program is operated only when the output code is not $\{2\}$.

In addition, although four comparators have been used to realize ⅕ resolution of the RX line pitch, it is also possible to detect the pen position by using only two comparators. In this case, instead of driving the TD with 3VDD/4 and VDD/4 in one operation cycle, the cycle is divided into two cycles and the TD is driven with 3VDD/4 in the first cycle and compared by using two comparators, and then the TD is driven with VDD/4 in the second cycle and compared by using two comparators.

The above process can also be applied to realize ⅐ resolution of the RX line pitch.

In addition, the driving algorithm related to the operation of the touch panel can also be applied to an integrated circuit (IC) and the integrated circuit can be applied to a driving chip of the touch panel.

The integrated circuit (IC) includes a plurality of comparators having a positive input terminal receiving a first input signal that varies depending on a touch position, a negative input terminal receiving a second input signal, and an output terminal outputting a comparison signal of the first and second input signals; and an operation unit 100 for generating a position signal by reading out the comparison signal of the comparators.

The operation unit 100 divides differential voltage, which is the difference between voltage of the first input signal and voltage of the second input signal, into three sections of 0, 1, and 2. When the center of the line to which the first input signal is introduced is set to 0 and the center of the line to which the second input signal is introduced is set to Lp, the three sections can be expressed as −Lp/4=X<Lp/4 (section 0), Lp/4=X<3Lp/4 (section 1), and 3Lp/4=X<5Lp/4 (section 2).

In addition, in a state that the output of the first comparator is set as the high-order bit and the output of the second comparator is set as the low-order bit, the operation unit 100 outputs 01[00] (decimal {0}) if section 0 is touched, outputs 01[01] (decimal {1}) if section 1 is touched, and output 01[11] (decimal {2}) if section 2 is touched, thereby detecting the touch position.

Figure 13:
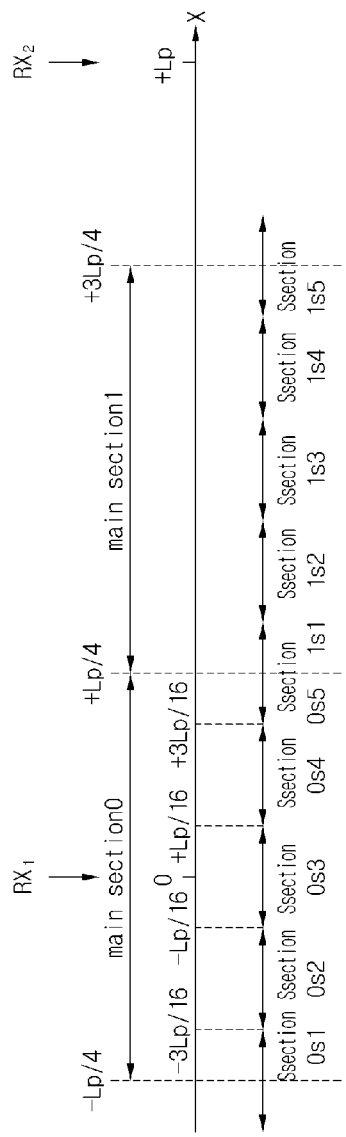
FIG. 13 is a view showing an example of section division of an RF line pitch according to another embodiment.

FIG. 13 is a view showing an example of section division of an RF line pitch according to another embodiment. As shown in FIG. 13, the touch position is divided into three sections of −Lp/4=X<Lp/4 (main section 0), Lp/4=X<3Lp/4 (main section 1), and 3Lp/4=X<5Lp/4 (main section 3).

If the touch position is divided as described above, main section 0 of the RX2-RX3 pair may be the same as section 3 of the RX1-RX2 adjacent to the RX2-RX3 pair, so the description thereof will be omitted in order to avoid redundancy.

The reason for setting the section −Lp/4=X<Lp/4, instead of 0=X<Lp/4, is that the $Cm_1$ exerts an influence upon the $RX_0$-$RX_1$.

In addition, for the purpose of position detection at the higher resolution, the main section is again divided into the sub-sections. The number of sub-sections may vary depending on the desired resolution of the touch position.

When the sub-section is divided such that the pen touch position can be detected with 1/n resolution, a section obtained through the n−1 division of the RX1-RX2 period is set as the length of one sub-section and the sub-sections are arranged such that the center of one sub-section is set to X=0.

For instance, as shown in FIG. 13, in the case of the sub-section division for ⅛ resolution, since the RX1-RX2 period is equally divided into eight sections, the length of one sub-section is Lp/8. Then, the sub-sections are arranged such that the X-coordinate value of one sub-section is set to 0. Thus, the X-coordinate at the boundaries of the sub-sections in main section 0 is set to −3Lp/16, −Lp/16, +Lp/16 and +3Lp/16.

In the same manner, the X-coordinate at the boundaries of the sub-sections in main section 1 is set to +5Lp/16, +7Lp/16, +9Lp/16 and +11Lp/16. The length of the sub-section existing at both side ends is Lp/16.

The process for improving the resolution of the touch position mainly includes two steps.

In the first step, the coordinate of the pen touch position is detected with ⅓ resolution. In the second step, the pen touch position is detected with high resolution based on the result of the pen touch position obtained in the first step.

A method of successive comparison can be used in the above steps.

The existence of the pen touch is detected in the first step. Since the resolution is low and the amount of data is small in the first step, the existence of the pen touch can be readily and rapidly detected.

In the second step, the lines subject to the pen touch are selectively operated. The TX lines, which are not subject to the pen touch, may not be operated. In order to detect the touch position with high resolution, it is advantageous if the number of the TX lines is reduced, so the detection time can be shortened.

Hereinafter, the first step will be described in more detail. According to the disclosure, the differential signal sensing is performed for detecting a difference between two signals, so signals of two adjacent Y electrode lines are regarded as pair signals.

According to the embodiment of the disclosure, a plurality of comparators are connected to two adjacent Y electrode lines, and the touch position on the touch screen can be detected based on the output code prepared by using output values of the comparators.

The pen touch position detection algorithm requires one or both of a digital output 2 bit code $0_0$ of the $RX_0$-$RX_1$ pair adjacent to each other at the left side of the $RX_1$-$RX_2$ pair and a digital output 2 bit code $0_2$ of the $RX_2$-$RX_3$ pair adjacent to each other at the right side the $RX_1$-$RX_2$ pair as well as a digital output 2 bit code $0_1$ of the $RX_1$-$RX_2$ pair (an output of a comparator 1-1 is a high-order bit and an output of a comparator 1-2 is a low-order bit), so all of them are illustrated.

First, ground voltage GND is applied to the X electrode lines $TX_1$-$TX_n$. To this end, the ground voltage GND may be applied to another TD electrode line TD extending across the Y electrode lines $RX_1$-$RX_m$.

Then, at the point of $t_1$, $V_{DD}$ voltage is applied to the $TX_1$ line. Thus, the potential of the $RX_1$ line is changed due to the capacitive coupling caused by $Cm_1$ so the potential variation $\Delta V_{RX}$ may occur in the RX line. The RX line has been initially precharged with $V_{DD}/2$.

The potential $VRX_1(t1)$ of the $RX_1$ line can be expressed as follows by taking the potential dependency of $Cm_1$ into consideration.

$$V_{RX1}(t1) = \frac{V_{DD}}{2} + \frac{C_E - C_{M1}(X)}{nC_E + 4C_S + C_D}V_{DD} \cong \qquad \text{Equation 30}$$

$$\frac{V_{DD}}{2} + \frac{C_E - C_{M1}(X)}{nC_E + C_D}V_{DD}$$

In equation 30, $C_s$ represents capacitance of sampling voltage holding capacitors, and $C_E$ represents capacitance of each coupling capacitor at the intersections between X electrode lines and Y electrode lines.

In the same manner, the potentials $VRX_0(t1)$, $VRX_2(t1)$, and $VRX_3(t1)$ of the $RX_0$, $RX_2$, and $RX_3$ lines can be expressed as follows by taking the position dependency of $Cm_2$ into consideration.

$$V_{RX0}(t1) \cong \frac{V_{DD}}{2} + \frac{C_E}{nC_E + C_D}V_{DD} \qquad \text{Equation 31}$$

$$V_{RX2}(t1) \cong \frac{V_{DD}}{2} + \frac{C_E - C_{M2}(X)}{nC_E + C_D}V_{DD}$$

$$V_{RX3}(t1) \cong \frac{V_{DD}}{2} + \frac{C_E}{nC_E + C_D}V_{DD}$$

At the point of t1, the potential of each RX line can be detected through the above equation. Thus, the $VRX_0(t1)$ can be held by the sampling capacitor $C_{S0a}$ of the comparator 0-1, the $VRX_1(t1)$ can be held by the sampling capacitor $C_{S1a}$ of the comparator 1-1 and the sampling capacitor $C_{S0d}$ of the comparator 0-2, the $VRX_2(t1)$ can be held by the sampling capacitor $C_{S2a}$ of the comparator 2-1 and the sampling capacitor $C_{S1d}$ of the comparator 1-2, and the $VRX_3(t1)$ can be held by the sampling capacitor $C_{S3a}$ of the comparator 3-1 and the sampling capacitor $C_{S2d}$ of the comparator 2-2.

Then, in order to realize ⅓ resolution, the TD is driven with $V_{DD}/2$ at the point of t3. Thus, the following equation can be established.

$$V_{RX0}(t3) \cong V_{RX0}(t1) + \frac{1/2C_D}{nC_E + C_D} V_{DD} \qquad \text{Equation 32}$$

$$V_{RX1}(t3) \cong V_{RX1}(t1) + \frac{1/2C_D}{nC_E + C_D} V_{DD}$$

$$V_{RX2}(t3) \cong V_{RX2}(t1) + \frac{1/2C_D}{nC_E + C_D} V_{DD}$$

$$V_{RX3}(t3) \cong V_{RX3}(t1) + \frac{1/2C_D}{nC_E + C_D} V_{DD}$$

In addition, if switches of S0*b*, S0*c*, S1*b*, S1*c*, S2*b*, and S2*c* are turned off at the point of t4, the $VRX_0(t3)$ is held by the sampling capacitor $C_{S0c}$ of the comparator 0-2, the $VRX_1(t3)$ is held by the sampling capacitor $C_{S1c}$ of the comparator 1-2 and the sampling capacitor $C_{S0b}$ of the comparator 0-1, the $VRX_2(t3)$ is held by the sampling capacitor $C_{S2c}$ of the comparator 2-2 and the sampling capacitor $C_{S1b}$ of the comparator 1-1, and the $VRX_2(t3)$ is held by the sampling capacitor $C_{S3c}$ of the comparator 3-2 and the sampling capacitor $C_{S2b}$ of the comparator 2-1, respectively.

If the differential sensing is operated at the point of t8 by activating the comparators 0-1, 0-2, 1-1 and 1-2, the differential voltage satisfies the following equations.

$$\Delta V_{comp0-1} \cong \frac{C_{M1}(X) - 1/2C_D}{nC_E + C_D} V_{DD} = \qquad \text{Equation 33}$$

$$\frac{V_{DD}}{nC_E + C_D} C_D \left(\frac{1}{2} - \frac{1}{Lp} X\right)$$

$$\Delta V_{comp0-2} \cong \frac{C_{M1}(X) + 1/2C_D}{nC_E + C_D} V_{DD} = \qquad \text{Equation 34}$$

$$\frac{V_{DD}}{nC_E + C_D} C_D \left(\frac{3}{2} - \frac{1}{Lp} X\right) \geq 0$$

$$\Delta V_{comp1-1} \cong \frac{\{C_{M2}(X) - C_{M1}(X)\} - 1/2C_D}{nC_E + C_D} V_{DD} = \qquad \text{Equation 35}$$

$$\frac{V_{DD}}{nC_E + C_D} 2C_D \left(\frac{1}{Lp} X - \frac{3}{4}\right)$$

$$\Delta V_{comp1-2} \cong \frac{\{C_{M2}(X) - C_{M1}(X)\} + 1/2C_D}{nC_E + C_D} V_{DD} = \qquad \text{Equation 36}$$

$$\frac{V_{DD}}{nC_E + C_D} 2C_D \left(\frac{1}{Lp} X - \frac{1}{4}\right)$$

$$\Delta V_{comp2-1} \cong \frac{-C_{M2}(X) - 1/2C_D}{nC_E + C_D} V_{DD} = \qquad \text{Equation 37}$$

$$\frac{V_{DD}}{nC_E + C_D} C_D \left(-\frac{1}{2} - \frac{1}{Lp} X\right) \leq 0$$

$$\Delta V_{comp2-2} \cong \frac{-C_{M2}(X) + 1/2C_D}{nC_E + C_D} V_{DD} = \qquad \text{Equation 38}$$

$$\frac{V_{DD}}{nC_E + C_D} C_D \left(\frac{1}{2} - \frac{1}{Lp} X\right)$$

If $\Delta V_{comp1-1}$ is equal to or higher than 0, the comparator 1-1 output a digital signal 1, and if $\Delta V_{comp1-1}$ is less than 0, the comparator 1-1 outputs a digital signal 0. If the 2 bit code is expressed as $0_1$ by setting the output of the comparator 1-1 as the high-order bit and the output of the comparator 1-2 as the low-order bit, the followings can be obtained based on equations 8 and 9, in which $-Lp/4 = X < Lp/4$ is $0_1[00]$, which is decimal {0}, $Lp/4 = X < 3Lp/4$ is $0_1[01]$, which is decimal {1}, and $3Lp/4 = X < 5Lp/4$ is $0_1[11]$, which is decimal {2}. That is, $0_1$ indicates the pen touch position.

In the same manner, the codes of $0_0$ and $0_2$ are obtained. When the code sequence is set as $0_0 \to 0_1 \to 0_2$, the code sequence of $0_0 \to 0_1 \to 0_2$ is expressed as $[11] \to [00] \to [01]$, that is, {2}→{0}→{1} in the case of $-Lp/4 = X < Lp/4$, that is, in the case of section 0. In addition, the code sequence of $0_0 \to 0_1 \to 0_2$ is expressed as $[11] \to [01] \to [00]$, that is, {2}→{1}→{0} in the case of $Lp/4 = X < 3Lp/4$. Further, in the case of $3Lp/4 = X < 5Lp/4$, the code sequence of $0_0 \to 0_1 \to 0_2$ is expressed as $[01] \to [11] \to [00]$, that is, {1}→{2}→{0}.

All codes except for the above three code sequences are expressed as [01]. Thus, if there is no pen touch, the code sequence of $0_0 \to 0_1 \to 0_2$ is expressed as $[01] \to [01] \to [01]$, that is, {1}→{1}→{1}. In generalization, if one left output code is added, the code sequence is expressed as $[01] \to [11] \to [00] \to [01]$ in the case of $-Lp/4 = X < Lp/4$. In addition, if one right output code is added, the code sequence is expressed as $[01] \to [11] \to [00] \to [01]$ in the case of $3Lp/4 = X < 5Lp/4$, so they cannot be distinguished from each other. However, in the case of the former, one block is shifted to the left. Thus, if the shift is corrected, both of them can indicate the same pen touch position.

Since there is no left-side pair adjacent to the leftmost pair, it is not necessary to consider the pen touch at the above region. This rule can also be applied to the rightmost pair.

If there is a pen touch to the leftmost pair, the code sequence of $0_0 \to 0_1 \to 0_2$ is expressed as $[00] \to [01] \to [01]$ according to the pen touch position in the case of $X < Lp/4$, that is, in the case of section 0. In addition, in the case of $Lp/4 = X < 3Lp/4$, that is, in the case of section 1, the code sequence of $0_0 \to 0_1 \to 0_2$ is expressed as $[01] \to [00] \to [01]$. Further, in the case of $3Lp/4 = X < 5Lp/4$, that is, in the case of section 2, the code sequence of $0_0 \to 0_1 \to 0_2$ is expressed as $[11] \to [00] \to [01]$.

As described above, the code sequence of $3Lp/4 = X < 5Lp/4$, which is the pen touch position of the leftmost pair ($RX_0$-$RX_1$ pair), is the same as the code sequence of $-Lp/4 = X < Lp/4$, which is the pen touch position of the $RX_1$-$RX_2$ pair.

In the same manner, if there is a pen touch to the rightmost pair, the code sequence of $0_{n-3} \to 0_{n-2} \to 0_{n-1}$ is expressed as $[01] \to [11] \to [00]$ according to the pen touch position in the case of $-Lp/4 = X < Lp/4$, that is, in the case of section 0. In addition, in the case of $Lp/4 = X < 3Lp/4$, that is, in the case of section 1, the code sequence of $0_0 \to 0_1 \to 0_2$ is expressed as $[01] \to [11] \to [01]$. Further, in the case of $3Lp/4 = X$, that is, in the case of section 2, the code sequence of $0_0 \to 0_1 \to 0_2$ is expressed as $[01] \to [01] \to [11]$.

The output code (for example, code of $0_3$) of RX pairs except for the RX pairs adjacent to left and right sides of the RX pair touched by the pen is expressed as [01] without exception. In this case, projection capacitance may not occur, so the following equation can be satisfied.

$$V_{RX3}(t1) \cong \frac{V_{DD}}{2} + \frac{C_E}{nC_E + C_D} V_{DD} \quad \text{Equation 39}$$

$$V_{RX4}(t1) \cong \frac{V_{DD}}{2} + \frac{C_E}{nC_E + C_D} V_{DD}$$

In the same manner as the case where the pen touch occurs, the potential $VRX_3(t1)$ may be held by the sampling capacitor $C_{S3a}$ of the comparator 3-1, and the potential $VRX_4(t1)$ is held by the sampling capacitor $C_{S3d}$ of the comparator 3-2.

In addition, the following equation is satisfied at the point of t3.

$$V_{RX3}(t3) \cong V_{RX3}(t1) + \frac{1/2 C_D}{nC_E + C_D} V_{DD} \quad \text{Equation 40}$$

$$V_{RX4}(t3) \cong V_{RX4}(t1) + \frac{1/2 C_D}{nC_E + C_D} V_{DD}$$

In the same manner as the case where the pen touch occurs, the potential $VRX_3(t3)$ may be held by the sampling capacitor $C_{S3c}$ of the comparator 3-2, and the potential $VRX_4(t3)$ is held by the sampling capacitor $C_{S3b}$ of the comparator 3-1. The differential input of each comparator satisfies the following equation.

$$\Delta V_{comp3-1} \cong \frac{-1/2 C_D}{nC_E + C_D} < 0 \quad \text{Equation 41}$$

$$\Delta V_{comp3-2} \cong \frac{1/2 C_D}{nC_E + C_D} > 0$$

The following rules can be obtained from the above.

In the case of the leftmost pair ($RX_0$-$RX_1$ pair), if $0_0$=[00]={0}, the pen touches section 0 of the $RX_0$-$RX_1$ pair. If $0_0$=[01]={1} and $0_1$=[00]={0}, the pen touches section 1 of the $RX_0$-$RX_1$ pair. If $0_0$=[11]={2} and $0_1$=[00]={0}, the pen touches section 2 of the $RX_0$-$RX_1$ pair.

In the case of the rightmost pair ($RX_{n-1}$-$RX_n$ pair), if $0_{n-2}$=[11]={2} and $0_{n-1}$=[01]={1}, the pen touches section 1 of the $RX_{n-1}$-$RX_n$ pair. If $0_{n-1}$=[11]={2}, the pen touches section 2 of the $RX_{n-1}$-$RX_n$ pair.

As to the pair except for the leftmost and rightmost pairs (that is, the $RX_k$-$RX_{k+1}$ pair), if $0_{k-1}$=[11]={2}, $0_k$=[01]={1}, and $0_{k+1}$=[00]={0}, the pen touches section 1 of the $RX_{k-1}$-$RX_k$ pair. If $0_{k-1}$=[01]={1}, $0_k$=[11]={2}, and $0_{k+1}$=[00]={0}, the pen touches section 2 of the $RX_{k-1}$-$RX_k$ pair.

If any of the above rules is not satisfied, it is determined that there is no pen touch.

In addition, if the pen touches the third section of the $RX_1$-$RX_2$ pair, the position detection is performed on the assumption that the third section is included in main section 0 of the $RX_0$-$RX_1$ pair.

Hereinafter, the second step will be described in more detail. In the second step, the operation when the pen touch occurs in main section 0 may be basically the same as the operation when the pen touch occurs in main section 1, but these operations will be described separately.

First, the position detection with ⅑ resolution when the pen touch occurs in main section 0 will be described as an example. The ⅑ resolution can be obtained by specifying the sub-section corresponding to the pen touch position. The specified order of the sub-sections where the pen touch occurs is as follows.

The value of $C_M$ is specified in equations 1 and 2. For instance, when the pen touch occurs at the position of X<0, if the TX is driven with $V_{DD}$, the difference between the potential $V_{RX0}$ and $V_{RX1}$ induced to the $RX_0$ and $RX_1$ satisfy the following equation.

$$V_{RX1} - V_{RX0} \cong \left\{ \frac{V_{DD}}{2} + \frac{C_E - C_{M1}(X)}{nC_E + C_D} V_{DD} \right\} - \quad \text{Equation 42}$$

$$\left\{ \frac{V_{DD}}{2} + \frac{C_E - C_{M0}(X)}{nC_E + C_D} V_{DD} \right\} = \frac{C_D V_{DD}}{nC_E + C_D} \left( \frac{2}{L_p} X + 1 \right)$$

If the pen touches the boundary point Xp=−3Lp/16 between sub-sections 0s1 and 0s2, the differential voltage applied to the $RX_1$ and $RX_0$ satisfies the following equation.

$$V_{RX1} - V_{RX0} = \frac{C_D V_{DD}}{nC_E + C_D}\left(-\frac{3}{8} + 1\right) = \frac{C_D}{nC_E + C_D} \times \frac{5}{8} V_{DD} \quad \text{Equation 43}$$

If the pen touch position exists to the left from the boundary point, the differential voltage obtained by taking the actual pen touch position into consideration may be lower in equation 42 than that of equation 43. In detail, if (equation 42)−(equation 43)<0, it is determined that the pen touch position X may exist to the left from Xp, that is, may exist in sub-section 0s1.

Based on the above principle, the pen touch position is detected. The above equations represent the reference potential serving as the basis for determining whether the pen touch position exist to the left of the boundary point or to the right of the boundary point.

The case where the pen touches the boundary point Xp=+3Lp/16 between sub-sections 0s4 and 0s5 is similar to the case where the pen touches the boundary point Xp=−3Lp/16. However, in this case, the following equation can be obtained by taking the potential $V_{RX1}$ and $V_{RX2}$ induced to the RX1 and RX2 into consideration.

$$V_{RX2} - V_{RX1} \cong \left\{ \frac{V_{DD}}{2} + \frac{C_E - C_{M2}(X)}{nC_E + C_D} V_{DD} \right\} - \quad \text{Equation 44}$$

$$\left\{ \frac{V_{DD}}{2} + \frac{C_E - C_{M1}(X)}{nC_E + C_D} V_{DD} \right\} = \frac{C_D V_{DD}}{nC_E + C_D} \left( \frac{2}{L_p} X + 1 \right)$$

If the pen touches the boundary point Xp=+3Lp/16 between sub-sections 0s4 and 0s5, the differential voltage satisfies the following equation.

$$V_{RX2} - V_{RX1} = \frac{C_D V_{DD}}{nC_E + C_D}\left(\frac{3}{8} - 1\right) = \frac{C_D}{nC_E + C_D} \times \frac{5}{8} V_{DD} \quad \text{Equation 45}$$

It can be understood from the above equation that the reference voltage at the boundary point between sub-sections 0s4 and 0s5 is the same as the reference voltage at the boundary point between sub-sections 0s1 and 0s2. This is because $C_{M1}$ serves as the symmetrical center of X=0, and $C_{M0}$ and $C_{M2}$ adopts X=0 as the symmetrical center. Therefore, the voltage for driving the TD may have the same value, so the differential voltage comparison for the symmetrical boundary points can be simultaneously achieved. As to the pen touch position, if (equation 44)−(equation 45)>0, it is determined that the pen touch position X may exist to the right from Xp, that is, may exist in sub-section 0s51.

Figure 14:
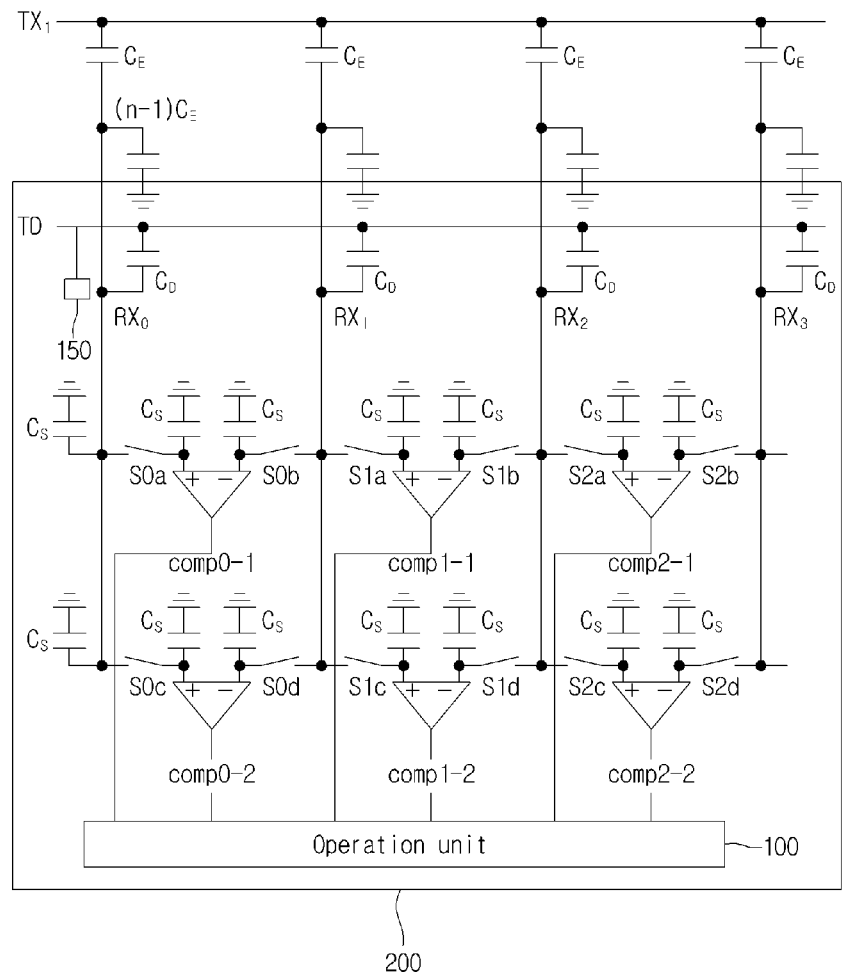
FIG. 14 is a circuit view showing a position detection circuit of an RX line according to another embodiment.

Hereinafter, the basic circuit operation will be explained with reference to FIG. 14.

In the second step, two cycles 2-1 and 2-2 are provided. If the pen touch position exists in sub-section 0s1 or 0s5, the sub-section is specified in the cycle 2-1. In addition, if the pen touch position exists in other sub-sections 0s2, 0s3 or 0s4, one sub-section is specified in the cycle 2-2.

In the cycle 2-1, the TX is driven at the point of t1, and the potential $V_{RX0}(t1)$, $V_{RX1}(t1)$ and $V_{RX2}(t1)$ are induced to each RX line. In addition, at the point of t2, one input switch of the comparator is turned off, and the induced voltage is held I the sampling capacitor Cs. That is, switches of S0*a*, S0*d*, S1*a*, S1*d*, S2*a*, and S2*d* are turned off.

The $V_{RX0}(t1)$ is held by the sampling capacitor $C_{S0a}$ of the comparator 0-1, the $V_{RX1}(t1)$ is held by the sampling capacitor $C_{S1a}$ of the comparator 1-1 and the sampling capacitor $C_{S0d}$ of the comparator 0-2, and the $V_{RX2}(t1)$ is held by the sampling capacitor $C_{S2a}$ of the comparator 2-1 and the sampling capacitor $C_{S1d}$ of the comparator 1-2.

At the point of t3, the TD is driven with 5VDD/8, and the potential $V_{RX0}(t3)$, $V_{RX1}(t3)$, and $V_{RX2}(t3)$ are induced to each RX line.

In detail, when the pen touches the boundary point of driving, the potential is applied to the TD in such a manner that the potential, which is the same as the potential difference between the first Y electrode line and the second Y electrode line adjacent to the first Y electrode line, can be induced at the point of t3.

That is, since the charge Q is proportional to the multiply of the capacitance C and the potential difference V, the capacitance of the touch region is changed, so the charge of the touch region is also changed. In this regard, the potential difference V applied to the TD at the point of t3 is changed and compared with the potential obtained at the point of t1.

Therefore, the touch position can be detected by determining whether the potential obtained at the point of t1 is higher than the potential obtained at the point of t3.

At the point of t4, switches of S0*b*, S0*c*, S1*b*, S1*c*, S2*b*, and S2*c* are turned off. The $V_{RX0}(t3)$ is held by the sampling capacitor $C_{S0c}$ of the comparator 0-2, the $V_{RX1}(t3)$ is held by the sampling capacitor $C_{S1c}$ of the comparator 1-2 and the sampling capacitor $C_{S0b}$ of the comparator 0-1, and the $V_{RX2}(t3)$ is held by the sampling capacitor $C_{S2b}$ of the comparator 2-2 and the sampling capacitor $C_{S1b}$ of the comparator 1-1.

Therefore, the input difference voltage of the comparators 0-2 and 1-2 may satisfy the following equation.

$$\Delta V_{comp0\text{-}2} \triangleq V_{RX0}(t1) + \frac{5/8C_D}{nC_E+C_D}V_{DD} - V_{RX1}(t1) =$$
$$-\left[\{V_{RX1}(t1)-V_{RX0}(t1)\} - \frac{5/8C_D}{nC_E+C_D}V_{DD}\right]$$
Equation 46

$$\Delta V_{comp1\text{-}2} \triangleq V_{RX1}(t1) + \frac{5/8C_D}{nC_E+C_D}V_{DD} - V_{RX2}(t1) =$$
$$-\left[\{V_{RX2}(t1)-V_{RX1}(t1)\} - \frac{5/8C_D}{nC_E+C_D}V_{DD}\right]$$
Equation 47

Thus, the result of (equation 42)−(equation 43) becomes the output (but, polarity is inversed) of the comparator 0-2, and the result of (equation 44)−(equation 45) becomes the output (but, polarity is inversed) of the comparator 1-2.

Accordingly, if the output of the comparator 0-2 is 1($\Delta$Vcomp0-2>0), it is determined that the pen touch position exists in sub-section 0s1.

In addition, if the output of the comparator 1-2 is 0($\Delta$Vcomp1-2<0), it is determined that the pen touch position exists in sub-section 0s5.

At this time, the comparators 0-1 and 1-1 satisfy the following equations.

$$\Delta V_{comp0\text{-}1} \triangleq V_{RX0}(t1) - \left\{V_{RX1}(t1) + \frac{5/8C_D}{nC_E+C_D}V_D\right\} =$$
$$\{V_{RX2}(t1)-V_{RX1}(t1)\} - \frac{5/8C_D}{nC_E+C_D}V_{DD}$$
Equation 48

$$\Delta V_{comp1\text{-}1} \triangleq V_{RX0}(t1) - \left\{V_{RX2}(t1) + \frac{5/8C_D}{nC_E+C_D}V_{DD}\right\} =$$
$$\{V_{RX1}(t1)-V_{RX2}(t1)\} - \frac{5/8C_D}{nC_E+C_D}V_{DD}$$
Equation 49

Then, in the cycle 2-2, the TX is driven at the point of t1, and the potential $V_{RX0}(t1)$, $V_{RX1}(t1)$, and $V_{RX2}(t1)$ are induced to each RX line.

In addition, in the same manner, one input switch of the comparator is turned off at the point of t2, and the induced voltage is held in the sampling capacitor.

At the point of t3, the TD is driven with 7VDD/8, the potential $V_{RX0}(t1)$, $V_{RX1}(t1)$, and $V_{RX2}(t1)$ are induced to each RX line.

The following equation can be obtained by calculating the reference voltage at the boundary point Xp=−Lp/16 between sub-sections 0s2 and 0s3 and at the boundary point Xp=+Lp/16 between sub-sections 0s3 and 0s4.

$$V_{RX1} - V_{RX0} = V_{RX2} - V_{RX1} = \frac{C_D}{nC_E+C_D} \times \frac{7}{8}V_{DD}$$
Equation 50

In addition, the TD is driven with 7VDD/8. The differential voltage of the comparators 0-2 and 1-2 satisfies the following equations.

$$\Delta V_{comp0\text{-}2} \triangleq -\{V_{RX1}(t1)-V_{RX0}(t1)\} - \frac{7/8C_D}{nC_E+C_D}V_{DD}$$
Equation 51

$$\Delta V_{comp1\text{-}2} \triangleq -\{V_{RX2}(t1)-V_{RX1}(t1)\} - \frac{7/8C_D}{nC_E+C_D}V_{DD}$$
Equation 52

Thus, when the pen touch position is determined as one of 0s2, 0s3, and 0s4 in the cycle 2-1, if the output of the comparator 0-2 is 1($\Delta$Vcomp0-2>0), it is determined that the pen touch position exists in sub-section 0s2. In addition, when the output of the comparator 1-2 is 0($\Delta$Vcomp1-2<0), it is determined that the pen touch position exists in sub-section 0s4. Further, if the output of the comparator 0-2 is 0 or the output of the comparator 1-2 is 1, it is determined that the pen touch position exists in sub-section 0s3. By the above procedure, the pen touch position can be detected with ⅑ resolution in main section 0.

When the pen touch occurs in main section 1, the process for detecting the pen touch position with ⅑ resolution is substantially similar to the above. However, since $C_{M1}$ and $C_{M2}$ adopts X=Lp/2 as the symmetrical center in main section 1, the symmetrical boundary point in the sub-section adopts X=Lp/2 as the symmetrical center.

In this regard, the following equation can be established by calculating the reference voltage at the boundary point between sub-sections 1s1 and 1s2.

$$V_{RX2} - V_{RX1} = \frac{C_D}{nC_E + C_D} \times \frac{3}{8} V_{DD} \qquad \text{Equation 53}$$

In addition, the following equation can be established by calculating the reference voltage at the boundary point between sub-sections 1s4 and 1s5.

$$V_{RX2} - V_{RX1} = \frac{C_D}{nC_E + C_D} \times \frac{-3}{8} V_{DD} \qquad \text{Equation 54}$$

In the cycle 2-1, if the TD is driven with 3VDD/8, the differential voltage of the comparators 1-1 and 1-2 are represented as follows.

$$\Delta V_{comp1\text{-}1} \cong -\left[\{V_{RX2}(t1) - V_{RX1}(t1)\} - \frac{-3/8 C_D}{nC_E + C_D} V_{DD}\right] \qquad \text{Equation 55}$$

$$\Delta V_{comp1\text{-}2} \cong -\left[\{V_{RX2}(t1) - V_{RX1}(t1)\} - \frac{3/8 C_D}{nC_E + C_D} V_{DD}\right] \qquad \text{Equation 56}$$

Therefore, if the output of the comparator 1-2 is 1 (ΔVcomp1-2>0), it is determined that the pen touch position exists in sub-section 1s1. In addition, if the output of the comparator 1-1 is 0(ΔVcomp1-1<0), it is determined that the pen touch position exists in sub-section 1s5.

In the cycle 2-2, the TD is driven with VDD/8. This is because the reference voltage at the boundary point between sub-sections 1s2 and 1s3 and at the boundary point between sub-sections 1s3 and 1s4 may be expressed as equations 57 and 58.

$$V_{RX2} - V_{RX1} = \frac{C_D}{nC_E + C_D} \times \frac{1}{8} V_{DD} \qquad \text{Equation 57}$$

$$V_{RX2} - V_{RX1} = \frac{C_D}{nC_E + C_D} \times \frac{-1}{8} V_{DD} \qquad \text{Equation 58}$$

When the TD is driven with VDD/8, the differential voltage of the comparators 1-1 and 1-2 may be expressed as following equations.

$$\Delta V_{comp1\text{-}1} \cong -\left[\{V_{RX2}(t1) - V_{RX1}(t1)\} - \frac{-1/8 C_D}{nC_E + C_D} V_{DD}\right] \qquad \text{Equation 59}$$

$$\Delta V_{comp1\text{-}2} \cong -\left[\{V_{RX2}(t1) - V_{RX1}(t1)\} - \frac{1/8 C_D}{nC_E + C_D} V_{DD}\right] \qquad \text{Equation 60}$$

Thus, in the cycle 2-1, when it is determined that the pen position is one of 1s2, 1s3, and 1s4, if the output of the comparator 1-2 is 1(ΔVcomp0-2>0), it is determined that the pen touch position exists in sub-section 1s2. In addition, if the output of the comparator 1-1 is 0(ΔVcomp1-2<0), it is determined that the pen touch position exists in sub-section 1s4. If the output of the comparator 1-1 is 1 or if the output of the comparator 1-2 is 0, it is determined that the pen touch position exists in sub-section 1s3. In addition, there is no comparison condition for the output of the comparator 0-2, so the output of the comparator 0-2 may not contribute to the determination of the pen touch position.

The detection for the pen touch position with ⅕ resolution has been described above. If there is no problem for ¼ resolution or ⅕ resolution, one cycle is enough in the second step. In addition, if ⅙, ⅐, ⅛ or ⅑ resolution is necessary, two cycles are required in the second step. If ⅒ resolution or above is necessary, at least three cycles are required in the second step.

In addition, sine the pen touch position can be detected in the first step, it is not necessary to drive the TX line having no pen touch in the second step. That is, the full scan for the TX line is not necessary, and only desired TX lines are selectively scanned, so the TX scan time in the second step can be shortened.

In the second step, it is possible to raise the level of the driving potential for the TX line, for instance, from VDD to 2VDD. In this case, the potential induced to the RX line is also increased by two times. Since only the desired TX lines are selectively driven in the second step, power consumption may not be significantly increased even if the driving level for the TX line is increased two times. In addition, if the driving level for the TX line is increased two times, the settling time for the potential of the TX line may be lengthened. However, since only the desired TX lines are selectively driven, the increased settling time may rarely exert an influence upon the total detection time, so the resolution can be improved by increasing the driving level two times.

In addition, the driving algorithm related to the operation of the touch panel can also be applied to an integrated circuit (IC) and the integrated circuit can be applied to a driving chip of the touch panel.

The integrated circuit (IC) 200 includes a plurality of comparators having a positive input terminal receiving a first input signal that varies depending on a touch position, a negative input terminal receiving a second input signal, and an output terminal outputting a comparison signal of the first and second input signals; a voltage applying unit 150 connected to the positive and negative input terminals to apply drive voltage; and an operation unit 100 for generating a position signal by reading out the comparison signal of the comparators.

The voltage difference between the positive input terminal and the negative input terminal may be divided into at least two main sections each of which is divided into at least two sub-sections, and the voltage applied from the voltage applying unit 150 serves as the voltage at the boundary point between adjacent sub-sections.

In addition, the operation unit 100 detects the touch position by comparing the potential difference value according to the touch position in the positive input terminal and the negative input terminal with the potential value applied from the voltage applying unit corresponding to the potential value at the boundary point between adjacent sub-sections.

In addition, a plurality of comparators connected in parallel to each other are set as one group, the operation unit 100 can generate the position signal by receiving the comparison signals of the comparators belonging to other groups adjacent to one group.

In addition, the integrated circuit can be independently installed in the touch panel or can be integrated in the form of a one-chip with a chip of a personal portable terminal or a driving chip of an LCD.

Figure 15:
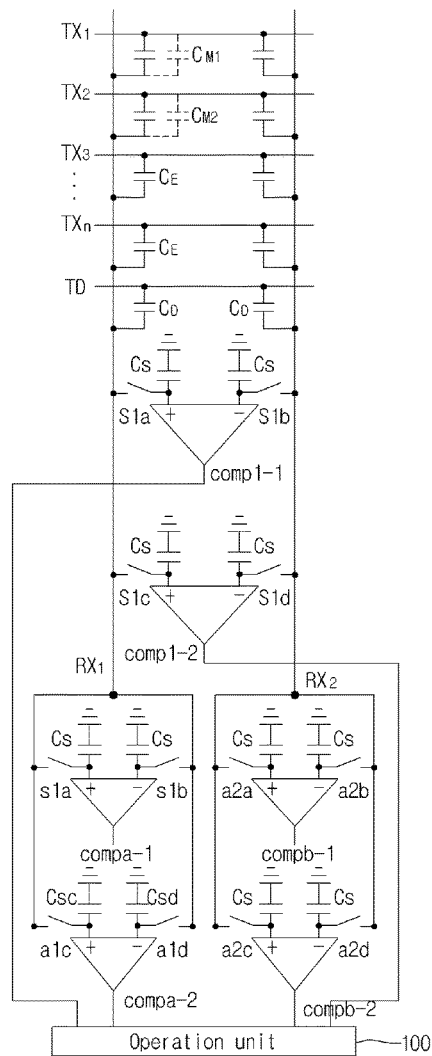
FIG. 15 is a circuit view showing main circuits to realize ⅕ resolution of a TX line pitch in a touch panel according to another embodiment.
Figure 16:
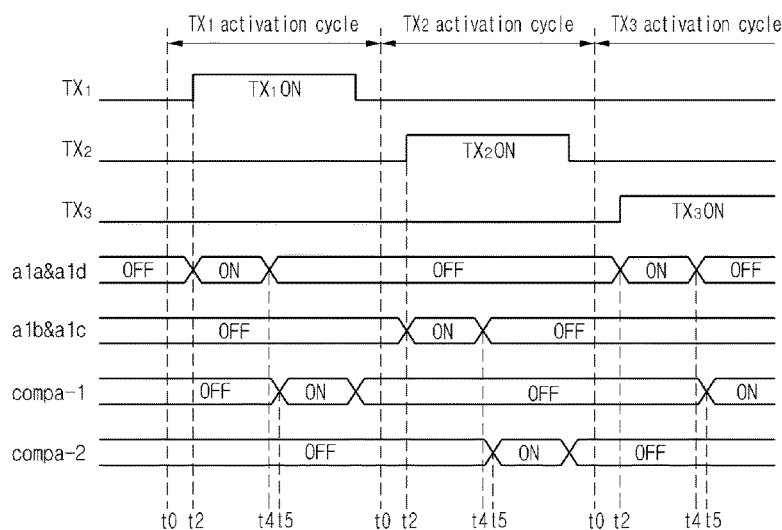
FIG. 16 is a diagram showing control signal points of main circuits for detecting a position of Y in FIG. 15.

FIG. 15 is a circuit view showing main circuits to realize ⅓ resolution of a TX line pitch in a touch panel according to another embodiment and FIG. 16 is a diagram showing control signal points of main circuits for detecting a position of Y in FIG. 15.

According to the embodiment of the disclosure, a plurality of comparators (comparators 1-1 and 1-2) are connected between two adjacent Y electrode lines, and the touch position related to the X-axis on the touch screen can be detected based on the output code prepared by using output values of the comparators (comparators 1-1 and 1-2). In addition, one Y electrode line branches into a plurality of lines and a plurality of comparators (comparators a-1, a-2, b-1, and b-2) are connected among a plurality of Y electrode lines branching from one electrode line. Further, the touch position related to the Y-axis on the touch screen can be detected based on the output code prepared by using output values of the comparators (comparators a-1, a-2, b-1 and b-2).

The comparators connected between the $RX_1$ electrode line and the $RX_2$ electrode line are illustrated as comparators 1-1 and 1-2, the comparators connected between the $RX_1$ electrode line and the left $RX_0$ electrode line are illustrated as comparators 0-1 and 0-2, and the comparators connected between the $RX_2$ electrode line and the right $RX_3$ electrode line are illustrated as comparators 2-1 and 2-2.

The pen touch position detection algorithm requires one or both of a digital output 2 bit code $0_0$ of the $RX_0$-$RX_1$ pair adjacent to each other at the left side of the $RX_2$-$RX_3$ pair and a digital output 2 bit code $0_2$ of the $RX_1$-$RX_2$ pair adjacent to each other at the right side of the $RX_1$-$RX_2$ pair as well as a digital output 2 bit code $0_1$ of the $RX_1$-$RX_2$ pair (an output of a comparator A-1 is a high-order bit and an output of a comparator A-2 is a low-order bit).

Hereinafter, the circuit operation of the touch panel according to the embodiment of the disclosure will be described. The position detection in the Y-axis direction consists of a $TX_1$ activation cycle, a $TX_2$ activation cycle, and a $TX_3$ activation cycle. As shown in the drawing, the time point of each cycle may have the different time value even if the same reference character is assigned to the time point.

Since the position detection in the X-axis direction has been described above, the position detection in the Y-axis direction will be described below.

The position detection in the Y-axis direction includes the $TX_1$ activation cycle, the $TX_2$ activation cycle, and the $TX_3$ activation cycle.

First, the operation of the $TX_1$ activation cycle will be described below.

At the point of t0, switches of a1a and a1d are turned on. Switches of a1b and a1c have been turned off in the previous cycle and maintain the off state at the point of t0, so the switches are continuously turned off.

Then, at the point of $t_1$, $V_{DD}$ drive voltage is applied to the $TX_1$ line. Thus, the potential of the $RX_1$ line is changed due to the capacitive coupling caused by $Cm_1$ so the potential variation $\Delta V_{RX\_}TX_1$ may occur in the RX line. The RX1 line has been initially precharged with $V_{DD}/2$. drive voltage VDD is applied to the $TX_1$ line at the point of t1. The potential $VRX_1(t1)$ of the $RX_1$ line can be expressed as follows by taking the position dependency of $Cm_1$ into consideration.

$$V_{RX1}(t1\_TX_1) = \frac{V_{DD}}{2} + \frac{C_E - C_{M1}(Y)}{nC_E + 4C_S + C_D}V_{DD} \cong \frac{V_{DD}}{2} + \frac{C_E - C_{M1}(Y)}{nC_E + C_D}V_{DD} \qquad \text{Equation 61}$$

In the above equation, $C_s$ represents capacitance of sampling voltage holding capacitors, and $C_E$ represents capacitance of each coupling capacitor at the intersections between X electrode lines and Y electrode lines.

The potential $V_{RX1}(t1\_TX_1)$ of the RX line is detected at the point of t1 of the $TX_1$ activation cycle, and switches of a1a and a1d are turned off at the point of t2. Thus, the $V_{RX1}(t1\_TX_1)$ can be held by the sampling capacitor Ca1a of the comparator a-1 and the sampling capacitor Ca1d of the comparator a-2.

Then, the comparator a-1 is activated at the point of t5 to operate the differential sensing. As shown in FIG. 2, the comparator a-2 is not operated in the $TX_1$ activation cycle. Thus, the potential $V_{RX1}(t1\_TX_1)$ can be still held in the sampling capacitor Ca1a of the comparator a-2.

After that, the $TX_2$ activation cycle starts. At the point of t0 at which the $TX_2$ activation cycle starts, the switches of a1b and a1c are turned on. The switches of a1a and a1d have been turned off in the previous cycle and hold the turn-off state at the point of t0 at which the $TX_2$ activation cycle starts.

Then, at the point of $t_1$, the $TX_2$ line is driven with $V_{DD}$. Thus, the potential of the $RX_1$ line is changed due to the capacitive coupling caused by $Cm_2$ so the potential variation $\Delta V_{RX\_}TX_2$ may occur in the RX line. The potential $VRX_1(t1\_TX2)$ of the $RX_1$ line can be expressed as follows by taking the position dependency of $Cm_2$ into consideration.

$$V_{RX1}(t1\_TX_2) \cong \frac{V_{DD}}{2} + \frac{C_E - C_{M2}(Y)}{nC_E + C_D}V_{DD} \qquad \text{Equation 62}$$

The potential $VRX_1(t1\_TX_2)$ of the RX line is detected at the point of t1, and the switches of a1b and a1c are turned off at the point of t2. Thus, the potential $VRX_1(t1\_TX_2)$ can be held by the sampling capacitor Ca1b of the comparator a-1 and the sampling capacitor Ca1c of the comparator a-2.

Then, the comparator a-2 is activated at the point of t5 to operate the differential sensing. The differential voltage $\Delta V$compa-2, which is the input signal of the comparator a-2, may satisfy the following equation.

$$\Delta V_{compa-2} = V_{RX1}(t1\_TX_1) - V_{RX1}(t1\_TX_2) \cong \qquad \text{Equation 63}$$
$$\frac{C_{M2}(Y) - C_{M1}(Y)}{nC_E + C_D}V_{DD} = \frac{V_{DD}}{nC_E + C_D}2C_D\left(\frac{1}{L_p}Y - 0.5\right)$$

If the digital output of the comparator a-2 is 0, Y=0.5Lp, that is, it is determined that the pen touch is closer to $TX_1$ on the basis of the center between the $TX_1$ and $TX_2$. If the digital output of the comparator a-2 is 1, it is determined that the pen touch is closer to $TX_2$ on the basis of the center between the $TX_1$ and $TX_2$.

In the same manner, the pen touch position between the $TX_2$ and $TX_3$ can be detected in the $TX_2$ activation cycle. In this case, the touch position is detected based on the digital output of the comparator a-1.

As described above, only one comparator is necessary to achieve ½ resolution, and the other comparator is not operated. In the other comparator, the potential $V_{RX1}$ ($t_1\_TX_2$) is held by the sampling capacitor and the potential $\overline{V_{RX1}}$ ($t_1\_TX_2$) is compared with the $V_{RX1}$($t_1\_TX_3$) in the next $TX_3$ cycle. In the $TX_3$ cycle, the potential $\overline{V_{RX1}}(t_1\_TX_3)$ is held by the sampling capacitor in another comparator. Thereafter, the comparison and potential holding operations are repeatedly performed. The position in the Y-axis can be detected through the above process.

In addition, according to the disclosure, the existence of pen touch to the corresponding RX pair block is determined and the target RX line is detected through the RX position detection algorithm. For instance, when the RX position resolution is 1/3 of the RX pitch, it is detected that the pen exists in section 2 or section 3 of $RX_0$-$RX_1$ or in section 2 of $RX_1$-$RX_2$ by the RX position detection algorithm. Then, the TX position detection is performed while focusing on the $RX_1$. The determination process may not be executed if it is determined that the RX lines have no pen touch. Since the RX position detection algorithm is combined, the TX position detection algorithm may be simplified.

In addition, the driving algorithm related to the operation of the touch panel can also be applied to an integrated circuit (IC) and the integrated circuit can be applied to a driving chip of the touch panel. The integrated circuit (IC) includes a plurality of first comparators having a positive input terminal receiving a first input signal which is related to an X-axis and varies depending on a touch position, a negative input terminal receiving a second input signal, and an output terminal outputting a comparison signal of the first and second input signals; a plurality of second comparators having a positive input terminal receiving a first input signal which is related to a Y-axis and varies depending on a touch position, a negative input terminal receiving a second input signal, and an output terminal outputting a comparison signal of the first and second input signals; and an operation unit 100 that generates a position signal related to the X-axis by reading out the comparison signal of the first comparators and generates a position signal related to the Y-axis by reading out the comparison signal of the second comparators.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A touch panel comprising:
   a touch screen including a plurality of X electrode lines and Y electrode lines, which are alternately disposed with each other, and generating signals that vary depending on a touch position; and
   a plurality of comparators, the plurality of first comparators including:
      a positive input terminal receiving a first input signal related to an X-axis and that varies depending on a touch position, a negative input terminal receiving a second input signal related to the X-axis, and an output terminal outputting a comparison signal of the first and second input signals related to an X-axis;
   a plurality of second comparators having a positive input terminal receiving a first input signal related to a Y-axis and varies depending on a touch position, a negative input terminal receiving a second input signal related to the Y-axis, and an output terminal outputting a comparison signal of the first and second input signals related to the Y-axis; and
   wherein the first comparators are connected in parallel to each other, and the second comparators are connected in parallel to each other,
   wherein the first input signal of the second comparators is provided from a first Y electrode line of the touch screen and the second input signal of the second comparators is provided from a second Y electrode line of the touch screen, wherein the touch position on the touch screen is detected based on output codes prepared by using output values of the second comparators, and
   wherein, when a pitch between the first and second Y electrode lines adjacent to each other is set to $1/n(n>2)$ touch resolution, $(n-1)$ comparators are disposed in parallel between the first and second Y electrode lines adjacent to each other,
   wherein n is an integer greater than one.

2. The touch panel of claim 1, wherein, when a center of the first Y electrode line is set to 0 and a center of the second Y electrode line is set to line pitch Lp, the touch position is divided into three sections of $-Lp/4 \leq X < Lp/4$ (section 0), $Lp/4 \leq X < 3Lp/4$ (section 1), and $3Lp/4 \leq X < 5Lp/4$ (section 2).

3. The touch panel of claim 2, wherein the touch position is detected by outputting bits that vary depending on touched sections in a state that a digital output 2 bit code of a pair of the first and second Y electrode lines is set as $0_1$, an output of the first comparator is set as a high-order bit, and an output of the second comparator is set as a low-order bit.

4. A touch panel comprising:
   first and second Y electrode lines, which are adjacent to each other and divided into at least two main sections, each of which is divided into at least two sub-sections; and
   a Touch Driving signal electrode line disposed across the first and second Y electrode lines,
   wherein a touch position on the touch panel is detected by comparing a potential difference value at a first time point according to the touch position between the first and second Y electrode lines with a potential value applied to the Touch Driving signal electrode line at a second time point corresponding to a potential value at a boundary point between adjacent sub-sections,
   wherein one main section is divided into odd sub-sections, and
   wherein a width of the sub-section disposed at both side ends of the sub-sections is a half of a width of the sub-section disposed at a center of the sub-sections.

5. The touch panel of claim 4, wherein a center of the sub-section located at a center of the sub-sections matches with a center of the main section including the sub-section located at the center of the sub-sections.

6. An integrated circuit comprising:
   a plurality of first comparators including a positive input terminal receiving a first input signal related to an X-axis and that varies depending on a touch position, a negative input terminal receiving a second input signal related to the X-axis, and an output terminal outputting a comparison signal of the first and second input signals related to an X-axis;
   a plurality of second comparators having a positive input terminal receiving a first input signal related to a Y-axis and varies depending on a touch position, a negative input terminal receiving a second input signal related to the Y-axis, and an output terminal outputting a comparison signal of the first and second input signals related to the Y-axis;

a voltage applying unit connected to the positive and negative input terminals to apply a drive voltage; and an operation unit generating a position signal by reading out the comparison signal of the comparators, wherein the first comparators are connected in parallel to each other, and the second comparators are connected in parallel to each other, wherein the first input signal of the second comparators is provided from a first Y electrode line of a touch screen and the second input signal of the second comparators is provided from a second Y electrode line of the touch screen, and wherein, when a pitch between the first and second Y electrode lines adjacent to each other is set to 1/n(n>2) touch resolution, (n−1) comparators of the plurality of first comparators are disposed in parallel between the first and second Y electrode lines adjacent to each other, wherein n is an integer greater than one.

7. The integrated circuit of claim 6, wherein the first input signal of the first comparators is provided from a first X electrode line of the touch screen and the second input signal of the first comparators is provided from a second X electrode line of the touch screen, wherein, when a pitch between the first and second X electrode lines adjacent to each other is set to 1/n(n>2) resolution, (n−1) comparators of the plurality of second comparators are disposed in parallel between the first and second X electrode lines adjacent to each other.

8. The integrated circuit of claim 7, wherein the first and second X electrode lines are divided into three sections by using the second comparators connected in parallel to each other and specifying one of the three sections according to the position signal output from the second comparators.

9. The integrated circuit of claim 6, wherein the integrated circuit is independently installed in a touch panel or integrated in a form of a one chip with at least one of a chip of a personal portable terminal and a driving chip of liquid crystal display (LCD).

10. The integrated circuit of 6, wherein the operation unit generates a position signal related to the X-axis by reading out the comparison signal of the first comparators and generates a position signal related to the Y-axis by reading out the comparison signal of the second comparators.

11. The integrated circuit of claim 6, wherein, when the comparators parallel-connected to each other are grouped in one group, the operating part receives comparative signals of comparators belonging to an adjacent another group to generate the position signal.

12. The integrated circuit of claim 6, wherein the first and second Y electrode lines are divided into three sections by using the first comparators connected in parallel to each other and specifying one of the three sections according to the position signal output from the first comparators.

\* \* \* \* \*